United States Patent
Akita et al.

(10) Patent No.: US 9,499,051 B2
(45) Date of Patent: Nov. 22, 2016

(54) PRESENTATION INFORMATION LEARNING METHOD, SERVER, AND TERMINAL DEVICE

(71) Applicant: Panasonic Intellectual Property Management Co., Ltd., Osaka (JP)

(72) Inventors: Takashi Akita, Hyogo (JP); Hiroshi Amano, Osaka (JP); Akira Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/776,934

(22) PCT Filed: Mar. 18, 2014

(86) PCT No.: PCT/JP2014/001544
§ 371 (c)(1),
(2) Date: Sep. 15, 2015

(87) PCT Pub. No.: WO2014/156055
PCT Pub. Date: Oct. 2, 2014

(65) Prior Publication Data
US 2016/0023553 A1    Jan. 28, 2016

(30) Foreign Application Priority Data

Mar. 28, 2013  (JP) ................................. 2013-070726

(51) Int. Cl.
*B60K 35/00* (2006.01)
*G07C 5/06* (2006.01)
(Continued)

(52) U.S. Cl.
CPC ............... *B60K 35/00* (2013.01); *G06F 12/08* (2013.01); *G07C 5/06* (2013.01); *G08G 1/093* (2013.01);
(Continued)

(58) Field of Classification Search
CPC .............. G08G 1/093; G08G 1/096716; G08G 1/096741; G08G 1/096775; G08G
(Continued)

(56) References Cited

U.S. PATENT DOCUMENTS 7,885,218 B2    2/2011  Nishiwaki
8,653,986 B2 *  2/2014  Tamir ................ G06Q 30/0283
                                                    340/438
(Continued)

FOREIGN PATENT DOCUMENTS

JP    2001-047949    2/2001
JP    2003-322528    11/2003
(Continued)

OTHER PUBLICATIONS

International Search Report issued Apr. 15, 2014 in International (PCT) Application No. PCT/JP2014/001544.
(Continued)

*Primary Examiner* — Tyler J Lee
(74) *Attorney, Agent, or Firm* — Wenderoth, Lind & Ponack, L.L.P.

(57) ABSTRACT

A presentation information learning method for performing learning for presenting information to a driver of a movable body, the presentation information learning method including: obtaining a result of a response from a driver to a presentation information item which is an information item included in a plurality of presentable information items and presented to the driver; identifying a driving load on the driver; and performing the learning by updating a reference
(Continued)

information item associated with the presentation information item from among reference information items which are associated one-to-one with a plurality of presentable information items and are referred to for judging whether or not the presentation information items are to be presented, based on the driving load identified and the obtained result of the response.

8 Claims, 18 Drawing Sheets

(51) Int. Cl.
*G08G 1/0969* (2006.01)
*G06F 12/08* (2016.01)
*G08G 1/09* (2006.01)
*G08G 1/0967* (2006.01)
*G06K 9/00* (2006.01)

(52) U.S. Cl.
CPC ...... *G08G 1/0969* (2013.01); *G08G 1/096716* (2013.01); *G08G 1/096741* (2013.01); *G08G 1/096775* (2013.01); *B60K 2350/1076* (2013.01); *B60K 2350/906* (2013.01); *G06K 9/00845* (2013.01)

(58) Field of Classification Search
CPC ................. 1/0969;G07C 5/06; G06K 9/00845; G06F 12/08; B60K 2350/1076; B60K 2350/906; B60K 35/00
USPC .................................................. 701/29.1, 36
See application file for complete search history.

(56) References Cited

U.S. PATENT DOCUMENTS

| | | | |
|---|---|---|---|
| 8,786,448 | B2 | 7/2014 | Oguri et al. |
| 2007/0076652 | A1 | 4/2007 | Nishiwaki |
| 2011/0035144 | A1* | 2/2011 | Okamoto ........... G01C 21/3641 701/532 |
| 2011/0093158 | A1* | 4/2011 | Theisen ................ G06F 9/4446 701/29.5 |
| 2012/0089423 | A1 | 4/2012 | Tamir et al. |
| 2012/0105234 | A1 | 5/2012 | Oguri et al. |
| 2014/0210604 | A1* | 7/2014 | Kawashima ........... B60K 35/00 340/439 |

FOREIGN PATENT DOCUMENTS

| | | |
|---|---|---|
| JP | 2007-102406 | 4/2007 |
| JP | 2008-204056 | 9/2008 |
| JP | 2008-305319 | 12/2008 |
| JP | 2011-18240 | 1/2011 |

OTHER PUBLICATIONS

European Search Report issued Apr. 6, 2016 in European Patent Application No. 14773579.9.

* cited by examiner

FIG. 6

| ID | Presentation condition A (Time) | Presentation condition B (Speed) | Presentation condition C (Temperature in car) | .... | Presentation condition N (Door sensor) |
|---|---|---|---|---|---|
| I1 | No condition | No condition | No condition | .... | Open |
| I2 | No condition | 30 km or more | No condition | .... | No condition |
| ... | ... | ... | ... | .... | ... |
| In | 11-13 o'clock | Stopped | No condition | .... | No condition |
| I(n+1) | No condition | No condition | No condition | .... | No condition |
| ... | ... | ... | ... | .... | ... |
| Im | No condition | No condition | 25 degrees Celsius or above | .... | No condition |
| ... | ... | ... | ... | .... | ... |

Presentation condition storage unit 500

FIG. 9

| Response result | YES | NO | No input | |
|---|---|---|---|---|
| Driving load | — | — | Low | High |
| Response type | Positive | Negative | Negative | Neutral |
| Variation in priority | +1 | -1 | -1 | 0 |

PRESENTATION INFORMATION LEARNING METHOD, SERVER, AND TERMINAL DEVICE

TECHNICAL FIELD

The present invention relates to a presentation information learning method for performing learning for presenting useful information to a driver of a movable body.

BACKGROUND ART

Conventionally, a system for presenting information to a driver in a vehicle has been proposed (for example, see Patent Literature 1). In this system, when a driving environment of a vehicle is detected and the driving environment satisfies an operation condition, guidance information regarding the use of an on-vehicle device is presented to the driver. Furthermore, in this system, when the driver does not use the on-vehicle device in response to presentation information, the information will never be presented later again even if the driving environment satisfies the operation condition. In this way, it is possible to prevent the driver who does not have an intention to use the information from being annoyed. In addition, a device for preventing information presentation to a driver based on a state of an accelerator has also been proposed (for example, Patent Literature 2).

CITATION LIST

Patent Literature

[PTL 1]
  Japanese Unexamined Patent Application Publication No. 2008-305319
[PTL 2]
  Japanese Unexamined Patent Application Publication No. 2001-047949

SUMMARY OF INVENTION

Technical Problem

However, PTL 1 and PTL 2 entail a problem that it is impossible to appropriately perform learning for presenting useful information to a driver.

For this reason, the present invention provides a presentation information learning method that makes it possible to appropriately perform learning for presenting useful information to a driver in a movable body.

Solution to Problem

In order to solve the above problem, the presentation information learning method according to an aspect of the present invention is a presentation information learning method for performing learning for presenting information to a driver of a movable body, the presentation information learning method including: obtaining a result of a response from a driver to a presentation information item which is an information item included in a plurality of presentable information items and presented to the driver; identifying a driving load on the driver; and performing the learning by updating a reference information item associated with the presentation information item from among reference information items which are associated one-to-one with a plurality of presentable information items and are referred to for judging whether or not the presentation information items are to be presented, based on the driving load identified and the obtained result of the response.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The presentation information learning method according to the present invention makes it possible to appropriately perform learning for presenting useful information to a driver in a movable body.

BRIEF DESCRIPTION OF DRAWINGS

FIG. 6 is a diagram illustrating an example of information stored in a presentation condition storage unit in the embodiment.

FIG. 9 is a diagram illustrating an example of a variation in priority in the embodiment.

Figure 1:
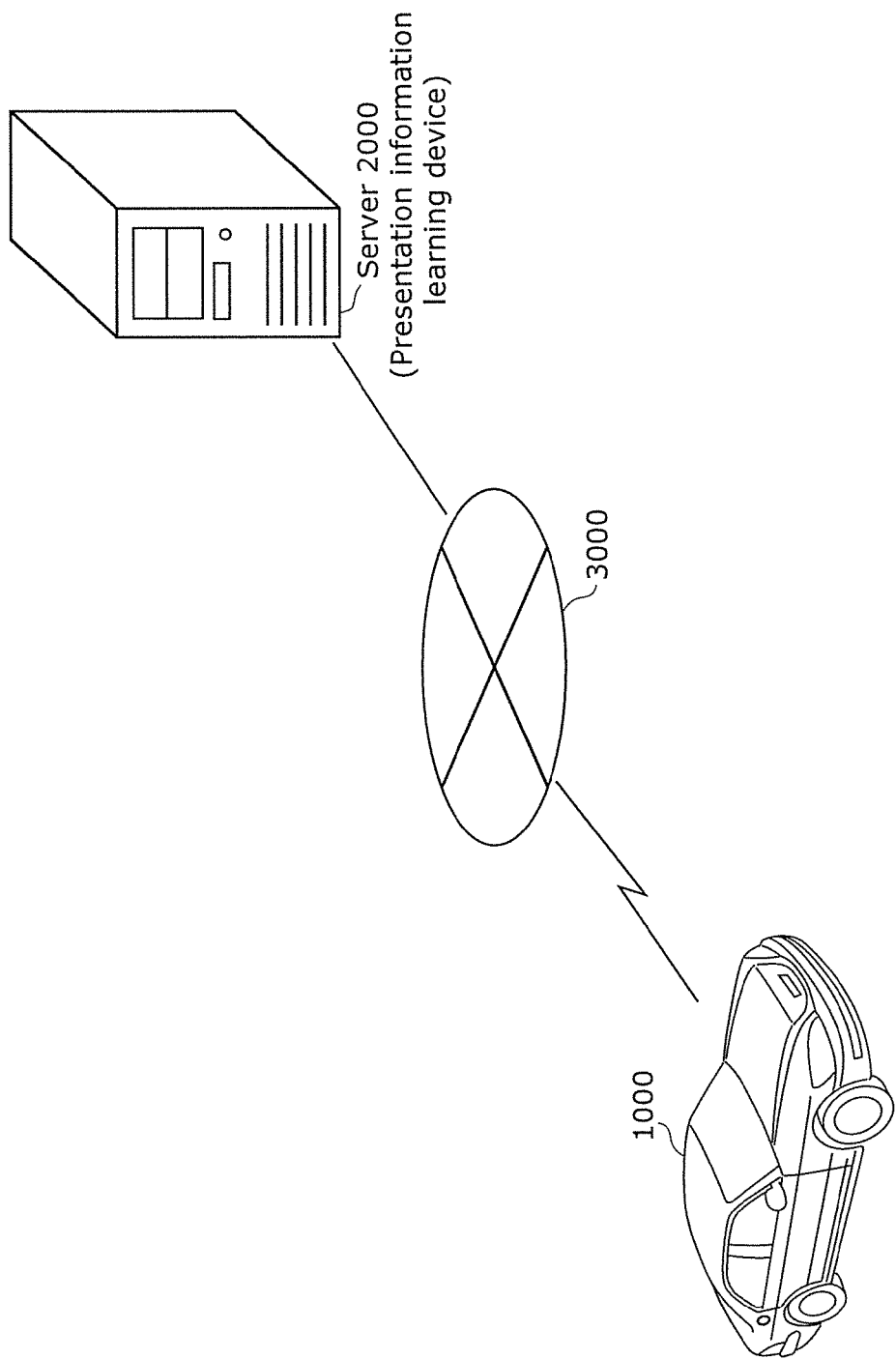
FIG. 1 is a diagram illustrating a configuration of a system in an embodiment.

DESCRIPTION OF EMBODIMENTS (Underlying Knowledge Forming Basis of the Present Disclosure)

In relation to the technique disclosed in the Background section, the inventors have found the problem below.

In the system in PTL 1, when the driver does not use the on-vehicle device in response to a presentation information item, the information will never be presented later again even if the driving environment satisfies the operation condition, as described above. In other words, in this system, learning for presenting useful information to the driver is performed based on the result of the response from the driver.

However, when a driving load on the driver is large, the driver may not be able to make a desired response. Accordingly, in such a case, the system in PTL 1 entails a problem that it is impossible to appropriately perform learning for presenting useful information to a driver.

In addition, in the device in PTL 2, a state of stepping on an accelerator is detected, and presentation of information to a driver is controlled according to the amount of stepping on the accelerator. In other words, the device estimates a driving load on the driver based on the state of stepping on the accelerator, and controls the presentation of the information to the driver when the driving load is large.

However, the device in PTL 2 is not capable of presenting useful information to the driver because presentation of information is controlled. In addition, even when the technique of PTL 2 is applied to the technique of PTL 1, presentation of information is controlled when a driving load is large, and thus it is impossible to receive a response from a driver and to thus appropriately perform learning for presenting useful information to the driver. Furthermore, a driving load varies every moment while driving a car, there is a case where a small driving load at the time when information presentation is started becomes high immediately after the start. In such a case, it becomes difficult for the driver to make a desired response. Accordingly, since the learning does not work appropriately, it is difficult to present useful information to the driver.

In order to solve the above problem, the presentation information learning method according to an aspect of the present invention is a presentation information learning method for performing learning for presenting information to a driver of a movable body, the presentation information learning method including: obtaining a result of a response from a driver to a presentation information item which is an information item included in a plurality of presentable information items and presented to the driver; identifying a driving load on the driver; and performing the learning by updating a reference information item associated with the presentation information item from among reference information items which are associated one-to-one with a plurality of presentable information items and are referred to for judging whether or not the presentation information items are to be presented, based on the driving load identified and the obtained result of the response.

In this way, the reference information item indicating whether or not the presentable information item is to be presented is updated based not only on the result of the response but also on the driving load on the driver. Thus, it is possible to appropriately perform learning for presenting useful information to the driver.

In addition, each of the plurality of presentable information items may be associated with a corresponding one of priorities, the corresponding priority being the reference information item, and in the learning, the learning may be performed by updating the priority associated with the presentation information item among priorities associated one-to-one with the plurality of presentable information items. For example, in the learning: judging whether the response from the driver is a positive response, a negative response, or a neutral response, based on the driving load identified and the obtained result of the response; increasing the priority associated with the presentation information item when the response from the driver is judged to be the positive response; decreasing the priority associated with the presentation information item when the response from the driver is judged to be the negative response; and maintaining the priority associated with the presentation information item when the response from the driver is judged to be the neutral response.

In this way, the priority is updated based not only on the result of the response but also on the driving load on the driver. Thus, it is possible to select a presentable information item that is more useful for the driver or a presentable information item that matches the preference of the driver more, with reference to the priorities associated one-to-one with the plurality of presentable information items, and present the selected presentable information item to the driver.

In addition, each of the plurality of presentable information items may be associated with a corresponding one of the reference information items, the corresponding one of the reference information items being a condition to be satisfied for presenting the presentation information item, and in the learning step, the learning may be performed by updating the condition associated with the presentation information item among conditions associated one-to-one with the plurality of presentable information items. For example, in the learning step: judging whether the response from the driver is a positive response, a negative response, or a neutral response, based on the driving load identified and the obtained result of the response; changing the condition associated with the presentation information item when the response from the driver is judged to be the positive response or the negative response; and maintaining the condition associated with the presentation information item when the response from the driver is judged to be the neutral response.

In this way, the condition (presentation condition) is updated based not only on the result of the response but also on the driving load on the driver. Thus, it is possible to select the presentable information item that is more useful for the driver or the presentable information item that matches the preference of the driver more, with reference to the conditions associated one-to-one with the plurality of presentable information items, and present the selected presentable information item to the driver.

In addition, in the learning step: judging whether or not the driving load identified is smaller than a threshold value when the result of the response obtained indicates that there was no response from the driver; judging that the response from the driver is the neutral response when the driving load is larger than or equal to the threshold value; and judging that the response from the driver is the negative response when the driving load is smaller than the threshold value.

In this way, in the case where the driving load is large when there was no response from the driver, no response from the driver is judged to be the neutral response. As a result, the priority or the condition is maintained without change. In other words, in a state where the driving load was large when there was no response from the driver, there was a sufficient possibility that the driver was not able to respond due to the large driving load when trying to make a desired response. Accordingly, the priority or the condition is maintained without change in this state, and thus it is possible to perform more appropriate learning. On the other hand, in the case where the driving load is small when there was no response from the driver, the response from the driver is judged to be the negative response. As a result, the priority or the condition is changed. In other words, in the case where the driving load was small when there was no response from the driver, there was a sufficient possibility that the driver was not interested in the presentation information item. Accordingly, the priority or the condition is maintained without change in this state, and thus it is possible to perform more appropriate learning.

In addition, in the learning step: judging whether or not the driving load identified is smaller than a threshold value when the result of the response obtained indicates that there was no response from the driver; maintaining the reference information item associated with the presentation information item among reference information items associated one-to-one with the plurality of presentable information items when the driving load is judged to be larger than or equal to the threshold value; and changing the reference information item associated with the presentation information item among reference information items associated one-to-one with the plurality of presentable information items when the driving load is judged to be smaller than the threshold value.

In this way, in the case where the driving load was high when there was no response from the driver, the reference information item is maintained without change. In other words, in a state where the driving load was large when there was no response from the driver, there was a sufficient possibility that the driver was not able to respond due to the large driving load when trying to make a desired response. Accordingly, the reference information item is maintained without change in this state, and thus it is possible to perform more appropriate learning. On the other hand, in the case where the driving load was small when there was no response from the driver, the reference information item is changed. In other words, in the case where the driving load was small when there was no response from the driver, there was a sufficient possibility that the driver was not interested in the presentation information item. Accordingly, the reference information item is changed in this state, and thus it is possible to perform more appropriate learning.

In addition, the presentation information learning method may further include selecting one presentation information item from among the plurality of presentable information items with reference to the reference information items associated one-to-one with the plurality of presentable information items, and causing an output unit to output the selected presentation information item as the presentation information item. For example, each of the plurality of presentable information items may be associated with the reference information items which are a corresponding one of conditions to be satisfied for presenting the presentation information item and a corresponding one of priorities, the presentation information learning method further including obtaining a state information item indicating a state of at least one of the movable body and the driver, wherein in the selecting, one of the presentation information items which may be associated with a priority higher than a reference value and a condition that satisfies the state indicated by the state information item obtained is selected from among the plurality of presentable information items.

In this way, it is possible to present a presentable information item that is more useful for the driver, stated differently, a presentable information item that matches the preference of the driver more.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, an embodiment is described with reference to the drawings.

Each of the embodiments described below indicates a general or specific example. The numerical values, shapes, materials, constituent elements, the arrangement and connection of the constituent elements, steps, the processing order of the steps etc. shown in the following exemplary embodiments are mere examples, and therefore do not limit the present invention. Therefore, among the constituent elements in the following exemplary embodiments, constituent elements not recited in any one of the independent claims each defining the most generic concept are described as arbitrary constituent elements.

[Embodiment]

FIG. 1 is a diagram illustrating a configuration of a system in an embodiment.

The system in this embodiment includes, for example: a terminal device mounted on a car 1000; and a server 2000 connected to the terminal device via a communication network 3000.

The car 1000 and each of devices such as a terminal device mounted on the car 1000 moves as a movable body when an operator (driver) drives. The server 2000 communicates with the respective terminal devices in the car 1000 via the communication network 3000. It is to be noted that the terminal device mounted on the car 1000 may be any movable body that moves when the driver drives, and may be a device mounted on the car 1000 in advance or a mobile terminal that can be carried separately from the car 1000.

More specifically, the terminal device creates a state information item indicating a state of at least one of the movable body and the driver and a response information item indicating a response of the driver to an information item presented by the movable body. Subsequently, the terminal device transmits the state information item and the response information item to the server 2000. The server 2000 receives the state information item and response information item transmitted from the terminal device, and performs learning for presenting useful information to the driver, using the state information item and response information item. In other words, the server 2000 in this embodiment includes a presentation information learning device, and performs the learning according to the presentation information learning method to be described later. Subsequently, the server 2000 selects a presentable information item to be presented to the driver, based on the result of the learning, and transmits it to the terminal device of the car 1000. When the terminal device receives the presentable information item, the terminal device causes an output unit that is at least one of a display and a speaker in the car 1000 to output the presentable information item in the form of an image or a sound. In this way, the presentable information item is presented to the driver. The presentable information item is obtained through a communication network such as the Internet, or from a local storage.

Figure 2:
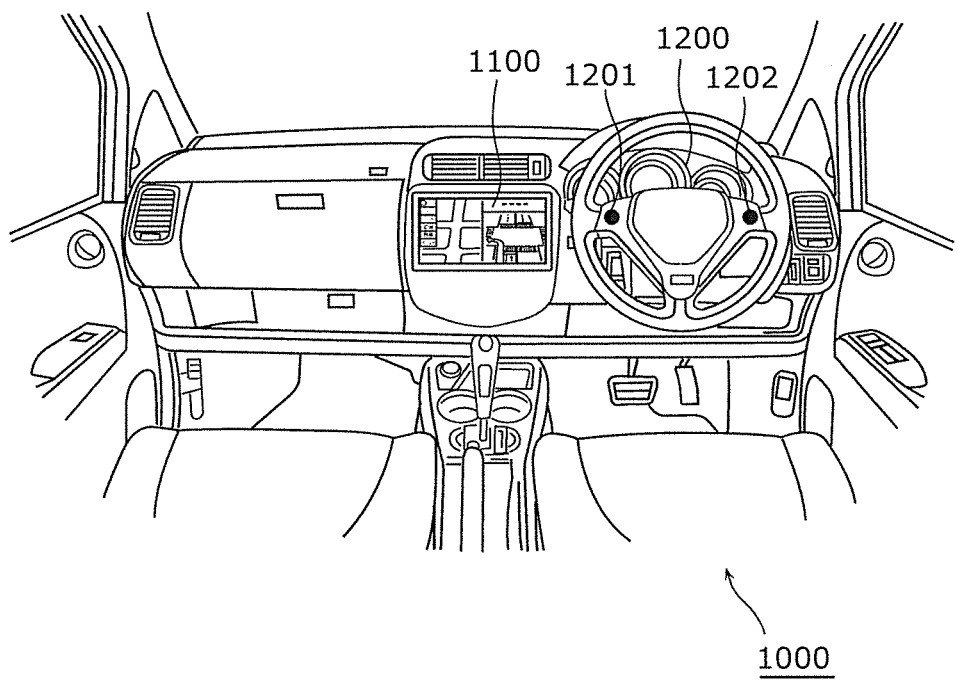
FIG. 2 is a diagram illustrating an inside of a car in the embodiment.

FIG. 2 is a diagram illustrating an inside of the car 1000 in the embodiment.

The car 1000 includes: a navigation device (car navigation device) 1100; an instrument panel (inpane) 1200; and switches 1201 and 1202.

The navigation device 1100 is provided at the left side of a steering wheel (hereinafter referred to as a steering wheel or a handle) of the car 1000. Here, the navigation device 1100 may be configured as the terminal device, or a device other than the navigation device 1100 and included in the devices in the car 1000 may be configured as the terminal device.

The instrument panel 1200 includes a liquid crystal display that displays at least one of a speed, a rotational speed, etc. of the car 1000. The instrument panel 1200 is also referred to as a meter display, a display meter, a panel display, or the like. The terminal device may display information on the instrument panel 1200, or may display information on a head-up display.

The switches 1201 and 1202 are attached to the steering of the car 1000, and receive an operation or a response from the driver.

Figure 3:
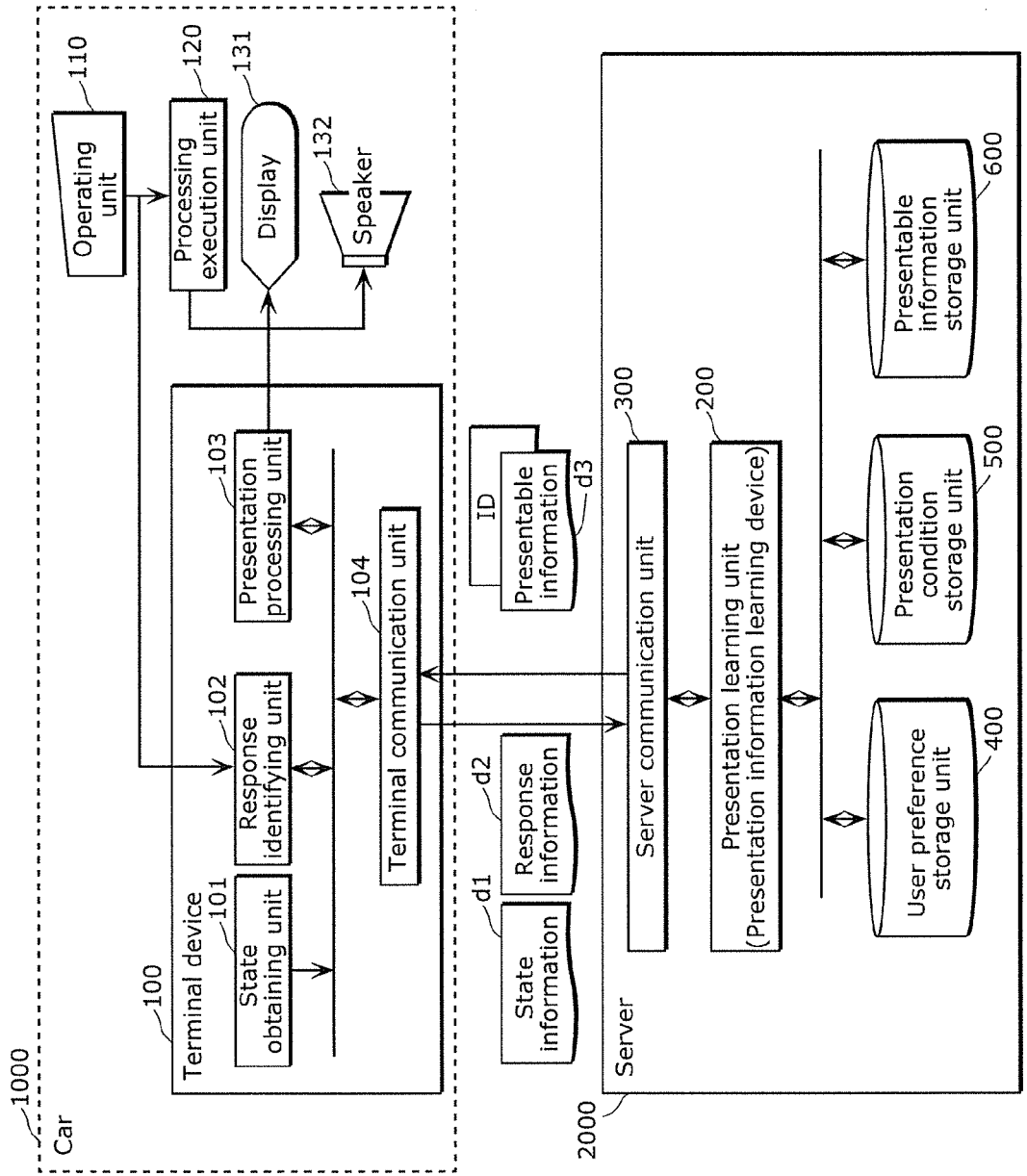
FIG. 3 is a block diagram illustrating configurations of a terminal device and a server in the embodiment.

FIG. 3 is a block diagram illustrating configurations of the terminal device 100 and the server 2000 in this embodiment.

The car 1000 includes: a terminal device 100; an operating unit 110; a processing execution unit 120; a display 131; and a speaker 132. At least one of the display 131 and the speaker 132 is referred to as an output unit hereinafter. In addition, the display 131 and the speaker 132 may be provided to the navigation device 1100, or may be provided to outside of the navigation device 1100.

The operating unit 110 includes the switches 1201 and 1202, and receives, for example, an operation on a device such as an air conditioner of the car 1000 or a driver response to the information output from the output unit. In addition, the operating unit 110 includes a microphone, and may receive the operation or response from the driver by recognizing speech of the driver collected through the microphone. In addition, the operating unit 110 may be provided to the car navigation device 1100, or to another device.

The processing execution unit 120 executes processing according to the operation or response received by the operating unit 110. In addition, the processing execution unit 120 causes the display 131 to display the image when the processing relates to display of the image, and causes the speaker 132 to output the sound when the processing relates to output of the sound. In addition, when the processing relates to adjustment of a room temperature in the car 1000, the processing execution unit 120 causes the air conditioner mounted on the car 1000 to adjust the currently-set temperature.

The terminal device 100 includes: a state obtaining unit 101; a response identifying unit 102; a presentation processing unit 103; and a terminal communication unit 104. The terminal communication unit 104 communicates with the server 2000 via the communication network 3000.

The state obtaining unit 101 obtains the state of at lease one of the car 1000, a device in the car 1000, the driver, and a passenger in the car 1000. The state is, for example, a current time measured by a clock, the open or closed state of a door of the car 1000 detected by a door sensor, a room temperature in the car 1000 detected by a temperature sensor, a position measured by a global positioning system (GPS), a speed or a rudder angle of a steering obtained through controller area network (CAN). This state may be a frequency of stepping on an accelerator, a frequency of stepping on a brake, a frequency of operating a steering, an eye motion of the driver, or the like.

The state obtaining unit 101 like this obtains the state, for example, at a predetermined cycle, and transmits a state information item d1 indicating the obtained state to the server 2000 via the terminal communication unit 104.

The response identifying unit 102 identifies details of the operation received by the operating unit 110. Subsequently, when details of the identified operation is a result of the response to the presentable information item presented (output) from the output unit, the response identifying unit 102 creates a response information item d2 indicating the result of the response, and transmits the response information item d2 to the server 2000 via the terminal communication unit 104.

The presentation processing unit 103 obtains a presentable information item d3 and an identification information item (ID) for identifying the presentable information item d3 from the server 2000 via the terminal communication unit 104. Subsequently, the presentation processing unit 103 causes the output unit that is at least one of the display 131 and the speaker 132 to output the presentable information item d3, thereby presenting the presentable information item d3 to the driver. In addition, when causing the output unit to output the presentable information item d3, the presentation processing unit 103 notifies the response identifying unit 102 of the identification information item. In this way, when the result of the response (for example, "YES" or "No") from the driver is identified, the response identifying unit 102 can find to which presentable information item d3 the result of the response relates. Accordingly, when creating the response information item d2, the response identifying unit 102 creates a response information item d2 in which the result of the response from the driver to the presented presentable information item d3 is indicated in association with an identification information item of the presentable information item d3.

The server 2000 includes: a server communication unit 300; a presentation learning unit 200; a user preference storage unit 400; a presentation condition storage unit 500; and a presentable information storage unit 600. The server communication unit 300 communicates with the terminal device 100 via the communication network 3000.

The presentation learning unit 200 is configured as a presentation information learning device, and performs learning for presenting useful information to the driver of the car 1000. Furthermore, the presentation learning unit 200 selects one of a plurality of presentable information items d3, as an information item that matches the preference of the driver more, based on the result of learning. Subsequently, the presentation learning unit 200 transmits the selected presentable information item d3 and an identification information item (ID) for identifying the presentable information item d3 to the terminal device 100 of the car 1000 via the server communication unit 300.

The presentable information storage unit 600 stores a plurality of presentable information items for presentation to the driver. The user preference storage unit 400 stores, as a priority, the strength of the preference of the driver to each of the plurality of presentable information items. The presentation condition storage unit 500 stores, as a presentation condition, a condition to be satisfied to present each of the plurality of presentable information items.

Figure 4:
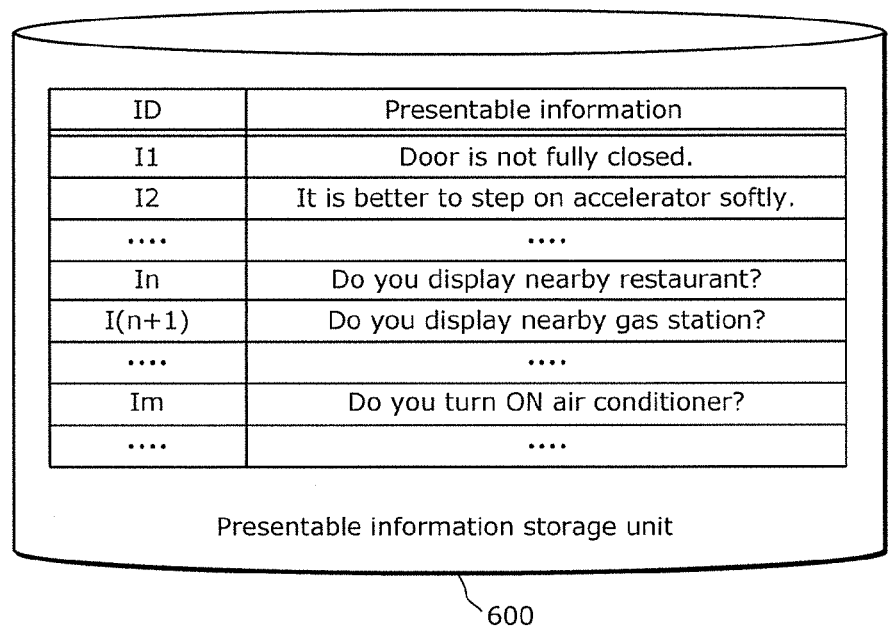
FIG. 4 is a diagram illustrating an example of information stored in a presentable information storage unit in the embodiment.

FIG. 4 is a diagram illustrating an example of information stored in the presentable information storage unit 600.

The presentable information storage unit 600 stores, for each presentable information item, the presentable information item and the identification information item (ID) for identifying the presentable information item in association with each other. For example, the presentable information storage unit 600 stores an identification information item "I1" and a presentable information item "Door is not fully closed." associated with the identification information item "I1", and further stores an identification information item "Im" and a presentable information item "Do you turn ON air conditioner?" associated with the identification information item "Im". In addition, the presentable information storage unit 600 further stores each of presentable information items in association with the identification information item thereof. Examples include: a presentable information item "Do you display nearby restaurant?" for asking whether to display information related to a facility around the car 1000; and a presentable information item "It is better to step on accelerator more softly." for causing the driver to pay attention, based on the state of the car 1000. The presentable information items may be information items stored in a local storage, or may be information items obtained in real time via the Internet etc.

Figure 5:
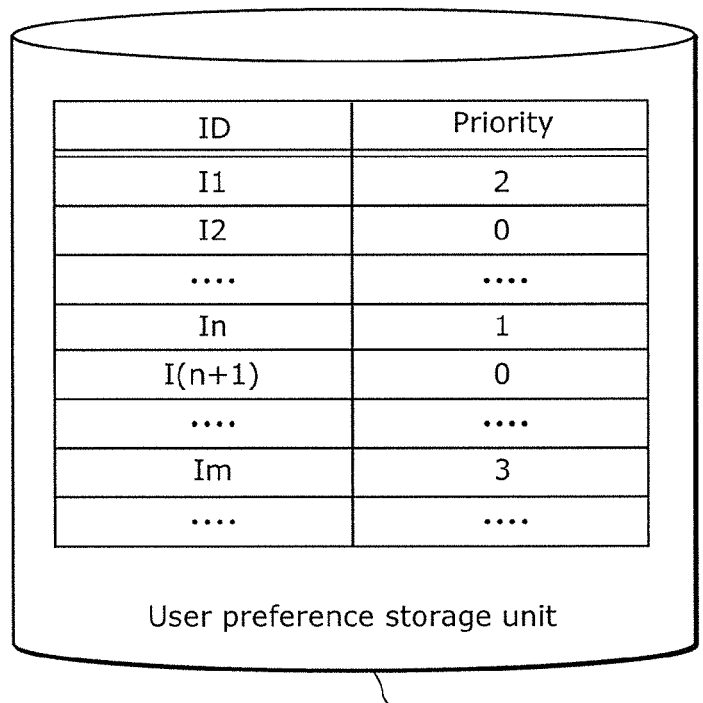
FIG. 5 is a diagram illustrating an example of information stored in a user preference storage unit in the embodiment.

FIG. 5 is a diagram illustrating an example of information stored in the user preference storage unit 400.

The user preference storage unit 400 stores, for each presentable information item, a priority indicating the strength of the preference of the user to the presentable information item and the identification information item of the presentable information item in an associated manner. For example, the user preference storage unit 400 stores an identification information item "I1" and a priority "2" associated with the identification information item, and further stores an identification information item "Im" and a priority "3" associated with the identification information item.

It is to be noted that the priority stored in the user preference storage unit 400 is, for example, set to an initial value, based on user profile information input by an input means (not illustrated) provided to the server 2000 or the terminal device 100. Subsequently, the priority is updated when necessary through later-described processing performed by the presentation learning unit 200. In the example illustrated in FIG. 5, each of the priorities is stored in one-to-one association with the identification information item (presentable information item), one of the priorities may be stored in association with a group including a plurality of similar presentable information items (a plurality of identification information items).

FIG. 6 is a diagram illustrating an example of information stored in the presentation information storage unit 500.

The presentation condition storage unit 500 stores, for each presentable information item, a condition group made up of presentation conditions A to N that are conditions to be satisfied to present the presentable information item in association with an identification information item of the presentable information item. For example, the presentation condition storage unit 500 stores the identification information item "I1" and the condition group associated with the identification information item. A presentation condition N included in the condition group is a condition that a door of the car 1000 is open. In addition, the presentation condition storage unit 500 stores the identification information item "Im" and the condition group associated with the identification information item. A presentation condition C included in the condition group is a condition that the room temperature in the car 1000 is 25 degrees Celsius or above.

In the example illustrated in FIG. 6, each of the condition groups (presentation conditions A to N) in the condition group is stored in one-to-one association with the identification information item (presentable information item). However, one condition group may be stored in association with a group including a plurality of similar presentable information items (a plurality of identification information items).

In this way, each of the presentable information items stored in the presentable information storage unit 600 is associated with the priority and the presentation condition (condition group) via the identification information item (ID).

Figure 7:
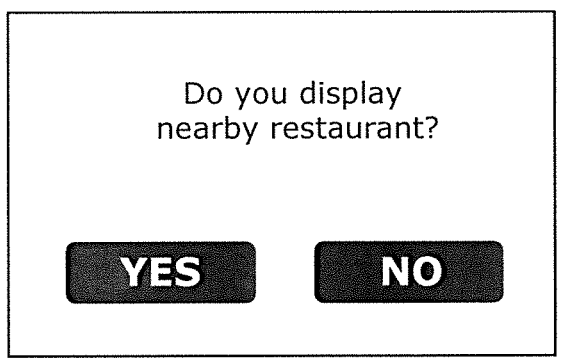
FIG. 7 is a diagram illustrating an example of a presentable information item displayed on a display in the embodiment.

FIG. 7 is a diagram illustrating an example of a presentable information item d3 displayed on the display 131.

The presentation processing unit 103 of the terminal device 100 obtains the presentable information item d3 of the identification information item "Im" from the server 2000, displays the image indicated by the presentable information item d3 on the display 131. In this case, a recommendation message of "Do you display nearby restaurant?" and response options "YES" and "NO" for allowing the driver to select, from among the responses, a response to the recommendation message are displayed as an image on the display 131. When the driver who viewed the image selects either the switch 1201 or the switch 1202, the response identifying unit 102 of the terminal device 100 creates a response information item d2 indicating the result ("YES" or "NO") of the response corresponding to the selected switch. In addition, when the driver who viewed the image does not select either the switch 1201 or the switch 1202, the response identifying unit 102 of the terminal device 100 creates a response information item d2 indicating that there was no response (no input) as the result of the response.

Figure 8:
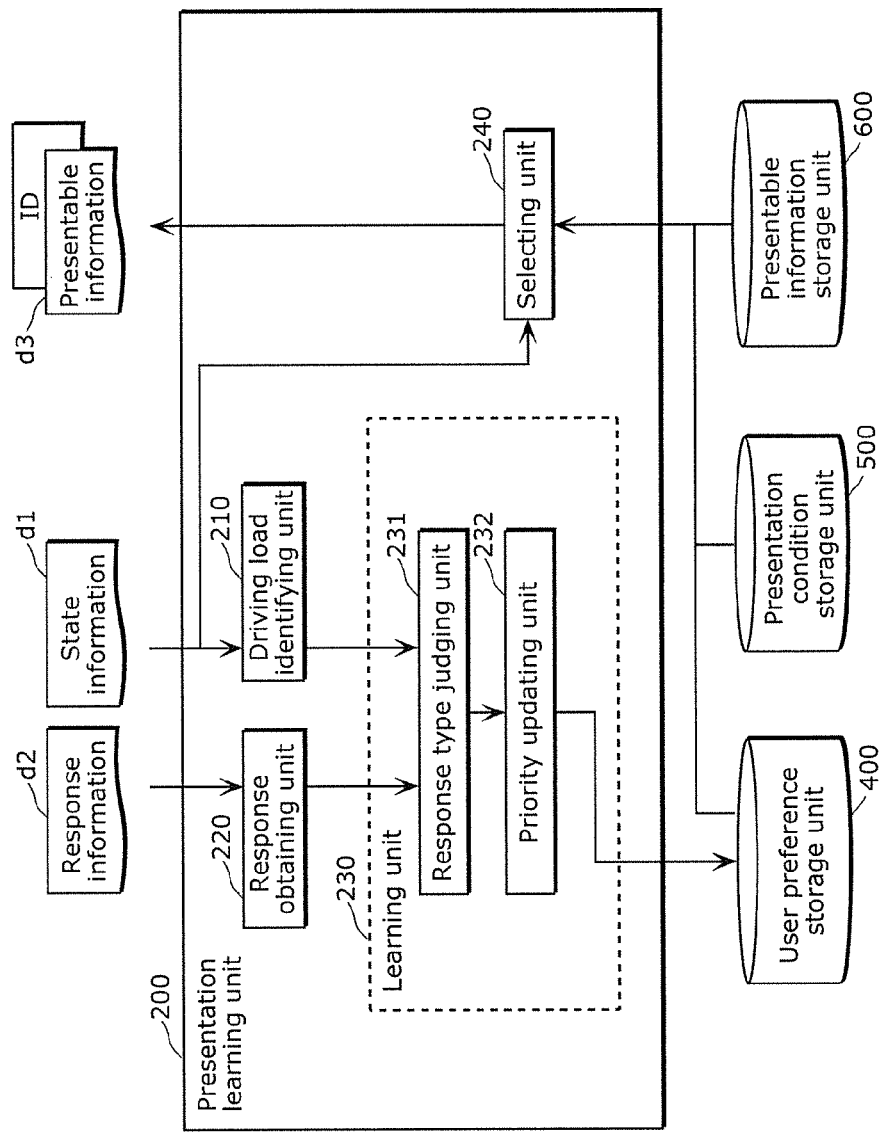
FIG. 8 is a block diagram illustrating a configuration of a presentation learning unit in the embodiment.

FIG. 8 is a block diagram illustrating a configuration of a presentation learning unit 200.

The presentation learning unit 200 includes: a driving load identifying unit 210; a response obtaining unit 220; a learning unit 230; and a selecting unit 240.

The driving load identifying unit 210 obtains a state information item d1 from the terminal device 100 via the server communication unit 300. Subsequently, the driving load identifying unit 210 identifies the driving load of the user as a numerical value, based on the state indicated by the state information item d1. This numerical value indicates a larger value when the driving load is larger, and a smaller value when the driving load is smaller. The driving load is identified using variation in a speed, a rudder angle of a steering, or the like of the car 1000 in the state obtained by the state obtaining unit 101. It is to be noted that a driving load like this is identified or estimated using a known technique. More specifically, when a state in which the driver steps on the brake or accelerator frequently is indicated by a state information item d1, the driving load identifying unit 210 identifies a large numerical value as indicating a high driving load. On the other hand, when a state in which the driver maintains the steering and drives the car 100 at a constant speed is indicated by a state information item d1, the driving load identifying unit 210 identifies a small numerical value as indicating a low driving load. Furthermore, the driving load identifying unit 210 notifies the learning unit 230 of the identified driving load.

The response obtaining unit 220 obtains a response information item d2 from the terminal device 100 via the server communication unit 300. Subsequently, the response obtaining unit 220 notifies the learning unit 230 of the identification information item regarding the presented presentable, information item and the result of the response to the presentable information item both indicated by the obtained response information item d2.

The selecting unit 240 selects one presentable information item from among a plurality of presentable information items with reference to reference information items associated one-to-one with the plurality of presentable information items stored in the presentable information storage unit 600. Here, the reference information items are a priority stored in the user preference storage unit 400 and a presentation condition (condition group) stored in the presentation condition storage unit 500. Subsequently, the selecting unit 240 transmits the selected presentable information item d3 and the identification of the presentable information item d3 to the terminal device 100 via the server communication unit 300. In other words, the selecting unit 240 outputs the selected presentable information item d3 from the output unit of the car 1000. In this way, the presentable information item d3 is presented to the driver as the presentation information item.

The learning unit 230 in this embodiment appropriately performs learning for presenting useful presentable information to the driver, based on the result of the response from the driver notified from the response obtaining unit 220 and the driving load of the driver notified from the driving load identifying unit 210. In other words, the learning unit 230 performs the learning by updating the priority stored in the use preference storage unit 400 based on the result of the response and the driving load.

The learning unit 230 includes a response type judging unit 231 and a priority updating unit 232.

The response type judging unit 231 judges which one of "Positive", "Negative", and "Neutral" is indicated as the type of the response from the driver, based on the driving load on the driver and the result of the response from the driver. Subsequently, the response type judging unit 231 notifies the preference updating unit 232 of the identification information item of the presentable information item notified from the response obtaining unit 220 and the judged response type.

The priority updating unit 232 updates the priority associated with the presentable information item that is a factor of the response in the user preference storage unit 400, based on the type of the response from the driver. It is to be noted that the presentable information item that is the factor of the response is identified by the identification information item notified from the response type judging unit 231.

In other words, when the type of the response from the driver is judged to be "Positive", the priority updating unit 232 raises the priority associated with the presentable information item that is the factor of the response. In other words, when the type of the response from the driver is judged to be "Negative", the priority updating unit 232 lowers the priority associated with the presentable information item that is the factor of the response. In other words, when the type of the response from the driver is judged to be "Neutral", the priority updating unit 232 maintains, without change, the priority associated with the presentable information item that is the factor of the response.

FIG. 9 is a diagram illustrating an example of a variation in priority in the embodiment.

For example, when the result of the response indicated by the response information item d2 obtained by the response obtaining unit 220 indicates "YES", the response type judging unit 231 judges that the type of the response from the driver is "Positive" irrespective of the driving load identified by the driving load identifying unit 210. As a result, the priority updating unit 232 adds a variation "+1" to the priority associated with the presentable information item that is the factor of the response. In this way, the priority is raised.

On the other hand, when the result of the response indicated by the response information item d2 obtained by the response obtaining unit 220 indicates "NO", the response type judging unit 231 judges that the type of the response from the driver is "Negative" irrespective of the driving load identified by the driving load identifying unit 210. As a result, the priority updating unit 232 adds a variation "−1" to the priority associated with the presentable information item that is the factor of the response. In this way, the priority is raised.

Here, the result of the response indicated by the response information item d2 obtained by the response obtaining unit 220 indicates that "There was no response (input).", the response type judging unit 231 judges whether the driving load identified by the driving load identifying unit 210 is larger than a threshold value. Subsequently, the response type judging unit 231 judges that the type of the response from the driver is "Negative" when the driving load is judged to be smaller than the threshold value. In other words, the fact that the driver did not respond even when the driving load was low means that the driver was not interested in the presentable information item, and thus the type of the response from the driver is judged to be "Negative". Accordingly, the priority updating unit 232 adds a variation "−1" to the priority associated with the presentable information item that is the factor of the response. In this way, the priority is raised.

On the other hand, the response type judging unit 231 judges that the type of the response from the driver is "Neutral" when the driving load is judged to be larger than or equal to the threshold value. In other words, the fact that there was no response from the driver when the driving load is large, there was a possibility that the driver was not able to pay attention to anything other than driving and to make a response. For this reason, the type of the response from the driver at this time is judged to be "Neutral". Accordingly, the priority updating unit 232 adds a variation "0" to the priority associated with the presentable information item that is the factor of the response. In this way, the priority is maintained without change.

Figure 10:
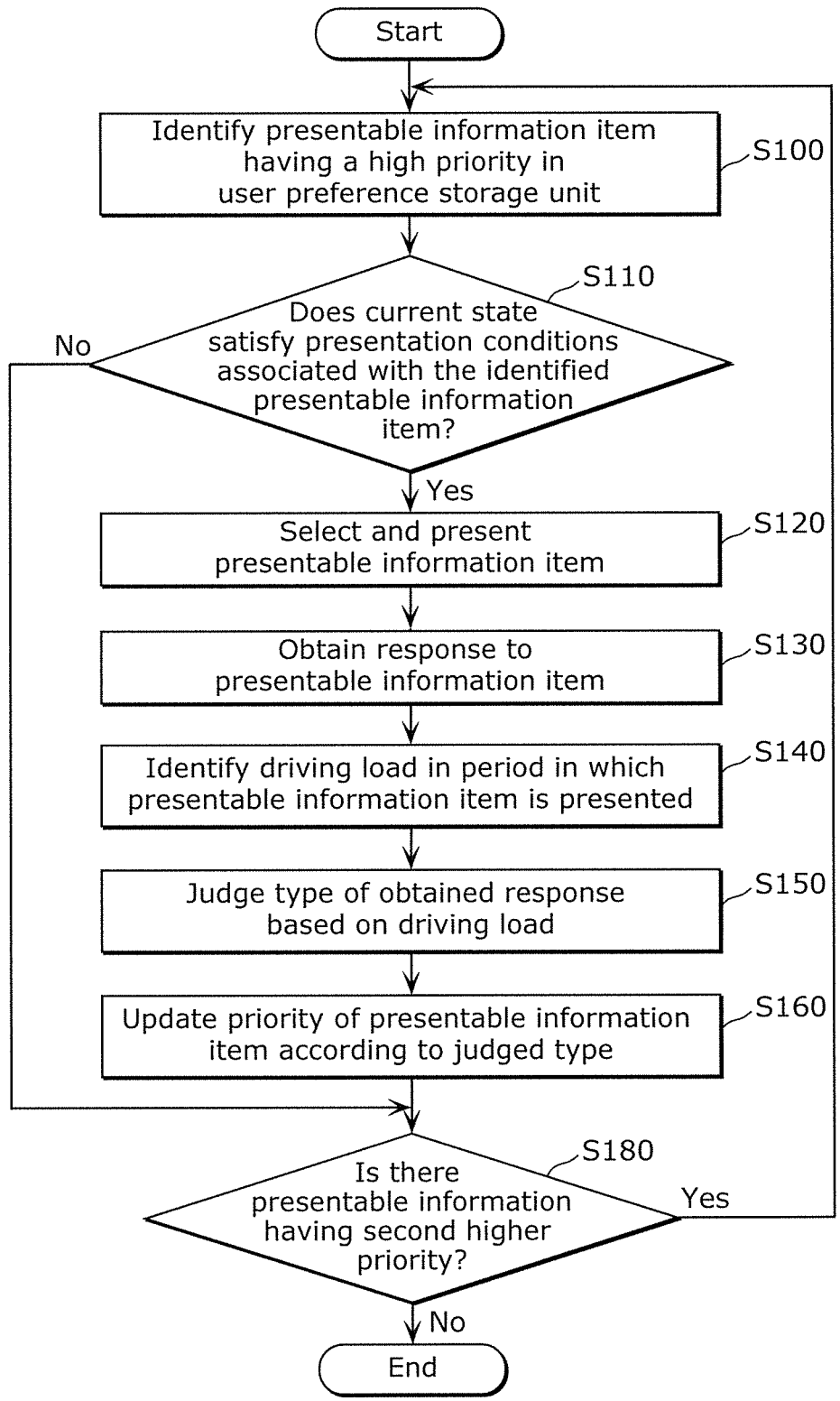
FIG. 10 is a flowchart of processing operations performed by a presentation learning unit in the embodiment.

FIG. 10 is a flowchart indicating processing operations (a presentable information learning method) performed by the presentation learning unit 200 in this embodiment.

The selecting unit 240 of the presentation learning unit 200 identifies, for example, a presentable information item having the highest priority among the plurality of presentable information items in the user preference storage unit 400 (Step S100). It is to be noted that the presentable information item having the highest priority is identified from among at least one presentable information item associated with a priority higher than a reference value (for example, 0) and unidentified so far among the plurality of presentable information items in the user preference storage unit 400. Here, for example, when the priority "1" is the highest, the presentable information item "Do you display nearby restaurant?" with the identification information item "In" is identified.

Next, with reference to the presentation condition storage unit 500, the selecting unit 240 decides whether a current state indicated by the latest state information item d1 transmitted from the car 1000 concurrently satisfies all of the presentation conditions (presentation conditions A to N) that make up a group of conditions associated with the identified presentable information items (Step S110). For example, in the presentation condition storage unit 500, all of the presentation conditions associated with the presentable information item "Do you display nearby restaurant?" with the identification information item "In" are: a presentation condition A "11 to 13 o'clock"; a presentation condition B "Stopped"; and presentation conditions C to N "No condition". In this case, whether or not the current time and speed indicated as a state by the state information item d1 concurrently satisfy the presentation condition A "11 to 13 o'clock" and the presentation condition B "Stopped", respectively. Since the presentation conditions C to N are "No condition", they are judged to be satisfied in any state.

Here, when the selecting unit 240 decides that all of the presentation conditions are not satisfied (No in Step S110), the selecting unit 240 decides whether or not there is a presentable information item with the second highest priority from the plurality of presentable information items in the user preference storage unit 400 (Step S180). When deciding that there is the presentable information item with the second highest priority (Yes in Step S180), the selecting unit 240 executes processing starting with Step S100. At this time, the presentable information item with the highest priority is identified from among the at least one presentable information item other than the presentable information items identified so far. In addition, when the selecting unit 240 decides that there was no presentable information item with the second highest priority (No in Step S180), the presentation learning unit 200 terminates the processing.

On the other hand, when the selecting unit 240 decides that all of the presentation conditions are concurrently satisfied in Step S110 (Yes in Step S110), the selecting unit 240 selects the identified presentable information item from the server preference storage unit 400, and transmits the presentable information item to the car 1000 via the server communication unit 300 (Step S120). In other words, the selecting unit 240 causes the output unit of the car 1000 to present the presentable information item as the presentation information item by causing the output unit to output the presentable information item. For example, the image as illustrated in FIG. 7 is displayed on the display 131 as the presentation information item.

Next, the response obtaining unit 220 obtains the response information item d2 indicating the result of the response from the driver to the presentation information item (presentable information item) presented in the car 1000 (Step S130).

The response information item d2 is an information item created by the response identifying unit 102 based on the output from the operating unit 110 having the switches 1201 and 1202 provided to the steering of the car 1000, and is transmitted to the server 2000. The switch 1201 is for making a response "YES", and the switch 1202 is for making a response "NO". Accordingly, the response identifying unit 102 identifies the result of the response from the driver by deciding which one of the switches 1201 and 1202 a signal is output or by detecting that no signal from any of the switches was output in a certain period. The response obtaining unit 220 obtains, in Step S130, a response information item d2 indicating "YES", "NO", "No response (No input)", or the like as the result of the response identified by the response identifying unit 102. When the switch 1201 for making the response "YES" is operated, the processing execution unit 120 of the car 1000 creates a map on which a nearby restaurant is shown, as processing corresponding to, for example, the presentable information item "Do you display nearby restaurant?", and displays the map on the display 131.

Subsequently, the response obtaining unit 220 notifies the response type judging unit 231 of the result of the response from the driver indicated by the response information item d2.

The driving load identifying unit 210 identifies the driving load on the driver, based on the state indicated by the state information item d1 each time when the state information item d1 is obtained. In addition, the driving load identifying unit 210 notifies the response type judging unit 231 of the latest driving load when necessary.

Here, when the response type judging unit 231 receives the result of the response from the driver from the response obtaining unit 220, the response type judging unit 231 finds out a driving load in a period in which a presentable information item selected in Step S120 is presented in the car 1000 as the presentation information item, from among driving loads on the driver notified when necessary from the driving load identifying unit 210 (Step S140).

Furthermore, the response type judging unit 231 judges whether the type of the response from the driver (response type) is "Positive", "Negative", or "Neutral", based on the notified result of the response and the found driving load (Step S150).

Subsequently, the priority updating unit 232 updates a priority stored in the user preference storage unit 400 in association with the presentable information item according to the response type judged in Step S150 (Step S160). It is to be noted that an update may be to raise a priority, to lower a priority, and to maintain a priority as it is. In addition, when a priority is updated to 0 or below, the selecting unit 240 prohibits the presentable information item associated with the priority from being selected for a certain period starting from now. The priority updating unit 232 may reset the priority to an initially set value after an elapse of the certain period.

When the update of priority like this is performed, the selecting unit 240 executes the processing in Step S180. In addition, the processing from Step S100 to S180 on all of the presentable information items associated with a priority higher than a reference value (such as 0) is repeatedly executed at a predetermined cycle for example.

In the example illustrated in FIG. 10, presentable information items that are processing targets are identified one by one from among the plurality of presentable information items according to the priorities thereof, and whether or not to present the identified presentable information item is determined every time the identification is made, using the condition group (the presentation conditions A to N). However, in Step S100, a plurality of presentable information items with a priority higher than the reference value may be identified. In this case, in Step S110, whether or not a current state satisfies all of the presentation conditions associated with the presentable information items is decided for each of the identified presentable information items. The processing from Steps S120 to S160 are executed only on presentable information items decided to satisfy all of the presentation conditions. In addition, processing in Step S110 is repeatedly executed at a predetermined cycle on presentable information items decided not to satisfy at least one of the presentation conditions. When a current state changes into a post-change current state, and the post-change current state is decided to satisfy all of the presentation conditions, the processing from Steps S120 to S160 is executed on the presentable information items.

Figure 11:
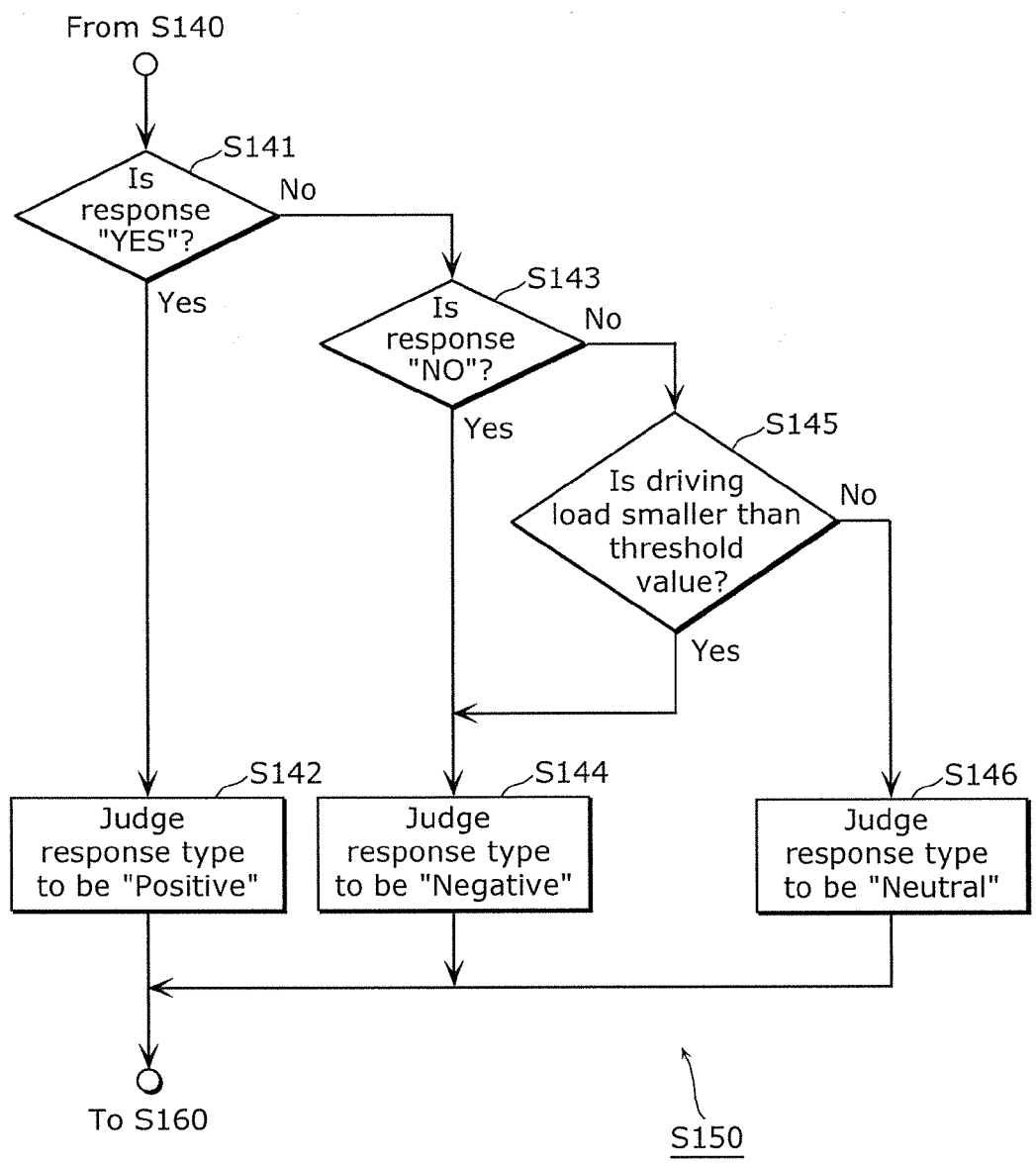
FIG. 11 is a flowchart of response type judging processing in the embodiment.

FIG. 11 is a flowchart of response type judging processing in Steps S150 of FIG. 10.

First, the response type judging unit 231 judges whether or not the notified result of the response is "YES" or not (Step S141). Here, when judging that the result is "YES" (Yes in Step S141), the response type judging unit 231 judges that the type of the response (response type) from the driver is "Positive" (Step S142). On the other hand, when judging that the result is not "YES" (No in Step S141), the response type judging unit 231 judges whether or not the type of the response (response type) from the driver is "No" (Step S143).

Here, when judging that the result is "NO" (Yes in Step S143), the response type judging unit 231 judges that the type of the response (response type) from the driver is "Negative" (Step S144).

On the other hand, when judging that the result is not "NO" (No in Step S143), the response type judging unit 231 judges that the type of the response from the driver indicates that there was no response (no input), a judgment is made as to whether or not the driving load identified by the driving load identifying unit 210 is smaller than the threshold value (Step S145). It is to be noted that the driving load at this time is a driving load on the driver in a period in which the presentable information item is presented as the presentation information item in the car 1000 as described above.

Here, when judging that the driving load is smaller than the threshold value (Yes in Step S145), the response type judging unit 231 judges that the response type is "Negative" (Step S144). On the other hand, when judging that the driving load is larger than or equal to the threshold value (No in Step S145), the response type judging unit 231 judges that the response type is "Neutral" (Step S146).

In the presentation information learning method in this embodiment, a priority (reference information) for determining whether to present a presentable information item is updated based not only on the result of the response from the driver but also on the driving load on the driver. Thus, it is possible to appropriately perform learning for presenting useful information to the driver. As a result, referring to the priorities each associated with corresponding one or more of the plurality of presentable information items, it is possible to select and present a presentable information item that is more useful for the driver, that is, a presentable information item that matches the preference of the driver more.

In the presentation information learning method in this embodiment, in the case where the driving load is high when there was no response from the driver, the response from the driver is judged to be a neutral response, and as a result, the priority is maintained without change. In other words, in a state where the driving load is large when there was no response from the driver, there was a sufficient possibility that the driver was not able to respond due to a large driving load when trying to make a desired response. Accordingly, the priority is maintained without change in this state, and thus it is possible to perform more appropriate learning. On the other hand, in the case where the driving load is small when there was no response from the driver, the response of the driver is judged to be a negative response, and as a result, the priority is changed. In other words, in the case where the driving load is small when there was no response from the driver, there was a sufficient possibility that the driver was not interested in the presentation information item. Accordingly, the priority is maintained without change in this state, and thus it is possible to perform more appropriate learning.

[Variation 1]

In the above-described embodiment, the priority included in the reference information to be referred to for judging whether or not to present the presentable information item is updated. However, the presentation condition may be updated.

Figure 12:
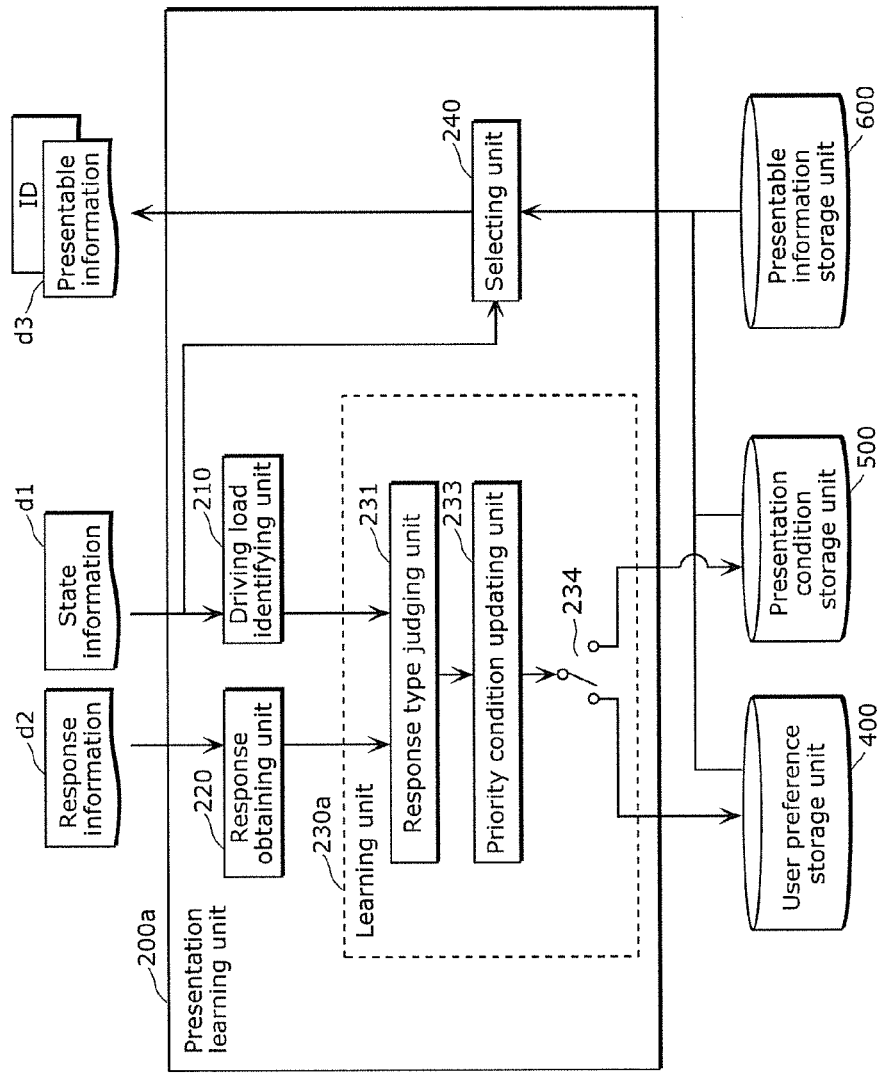
FIG. 12 is a block diagram illustrating a configuration of a presentation learning unit according to a variation of the embodiment.

FIG. 12 is a block diagram illustrating a configuration of a presentation learning unit 200a according to this variation.

The presentation learning unit 200a according to this variation includes; a response obtaining unit 220; a driving load identifying unit 210; a selecting unit 240; and a learning unit 230a. In other words, only the learning unit 230a among the elements provided to the presentation learning unit 200a according to this variation is different from the constituent elements of the presentation learning unit 200 in the above-described embodiment.

The learning unit 230a updates, as an update target, one of a priority and a presentation condition, based on a result of the response from a driver and a driving load. The learning unit 230a includes: a response type judging unit 231; a priority condition updating unit 233; and a switch 234. The response type judging unit 231 is the same as the response type judging unit 231 in the above-described embodiment, and performs the same processing operation.

The priority condition updating unit 233 switches the update target between the priority and the presentation condition by controlling the switch 234. For example, the priority condition updating unit 233 sets a presentation condition as the update target in advance for a predetermined presentable information item. When it is impossible to obtain a response type of "Positive" to the presentable information item from the driver by updating the presentation condition in any way, the update target may be switched from the presentation condition to the priority. On the other hand, the priority condition updating unit 233 sets a priority as the update target in advance for the predetermined presentable information item. When the type of a response from the driver to the presentable information item is judged to be "Negative" repeatedly, and the priority reaches a reference value (for example, 0), the update target may be switched from the priority to the presentation condition.

When the update target is switched to the presentation condition, the priority condition updating unit 233 updates the presentation condition instead of the priority. For example, at the time when a presentable information item "Do you display nearby restaurant?" is presented as the presentation information item, the response type judging unit 231 judges that the type of the response from the driver to the presentation information item is "Negative" through response type judging processing illustrated in FIG. 11. In this case, the priority condition updating unit 233 updates a presentation condition A "11 to 13 o'clock" stored in the presentation condition storage unit 500 in association with the presentation information item (presentable information item). For example, the presentation condition A "11 to 13 o'clock" is updated to "12 to 14 o'clock".

In addition, a presentable information item "Do you turn ON air conditioner?" is presented as the presentation information item, and at this time, the response type judging unit 231 judges that the type of the response from the driver to the presentation information item is "Negative" through the response type judging processing illustrated in FIG. 11. In this case, the priority condition updating unit 233 updates a presentation condition C "25 degrees Celsius or above" stored in the presentation condition storage unit 500 in association with the presentation information item (presentable information item). For example, a presentation condition C "25 degrees Celsius or above" is updated to "26 degrees Celsius or above". In other words, in the case where a room temperature in the car 1000 reaches 25 degrees Celsius when the presentation condition C before the update is "25 degrees Celsius or above", a message of "Do you turn ON air conditioner?" for recommending start of cooling is presented to the driver. At this time, when the driver made a response "NO", or did not respond even though a driving load is small, the presentable information item "Do you turn ON air conditioner?" was an information item unnecessary for the driver at the time of the presentation. Accordingly, in such a case, the priority condition updating unit 233 updates the presentation condition C "25 degrees Celsius or above" to "26 degrees Celsius or above". On the other hand, when the driver did not respond when a driving load was large, there was a possibility that the driver was focusing on the driving and was not able to respond to the presentable information item "Do you turn ON air conditioner?". Started differently, the presentable information item might be an information item useful for the driver. Accordingly, in such a case, the priority condition updating unit 233 maintains the presentation condition C "25 degrees Celsius or above" without update.

In the presentation information learning method in this variation, a presentation information (reference information) for determining whether to present a presentable information item is updated based not only on the result of the response from the driver but also on the driving load on the driver. Thus, it is possible to perform learning for presenting useful information to the driver appropriately. As a result, referring to the presentation conditions each associated with a corresponding one of the plurality of presentable information items, it is possible to select and present the corresponding presentable information item that is more useful for the driver, that is, the presentable information item that matches the preference of the driver more.

In the presentation information learning method in this embodiment, in the case where the driving load was large when there was no response from the driver, the response from the driver is judged to be a neutral response, and as a result, the presentation condition is maintained without change. In other words, in a state where the driving load is large when there was no response from the driver, there was a sufficient possibility that the driver was not able to respond due to a large driving load when trying to make a desired response. Accordingly, the presentation condition is maintained without change in this state, and thus it is possible to perform more appropriate learning. On the other hand, in the case where the driving load is small when there was no response from the driver, the response of the driver is judged to be a negative response, and as a result, the presentation condition is changed. In other words, in the case where the driving load was small when there was no response from the driver, there was a sufficient possibility that the driver was not interested in the presentation information item. Accordingly, the presentation condition is changed in this state, which makes it possible to perform more appropriate learning.

[Variation 2]

In the above embodiment, the server 2000 performs learning for presenting information to the driver. However, the terminal device 100 may perform the learning.

Figure 13:
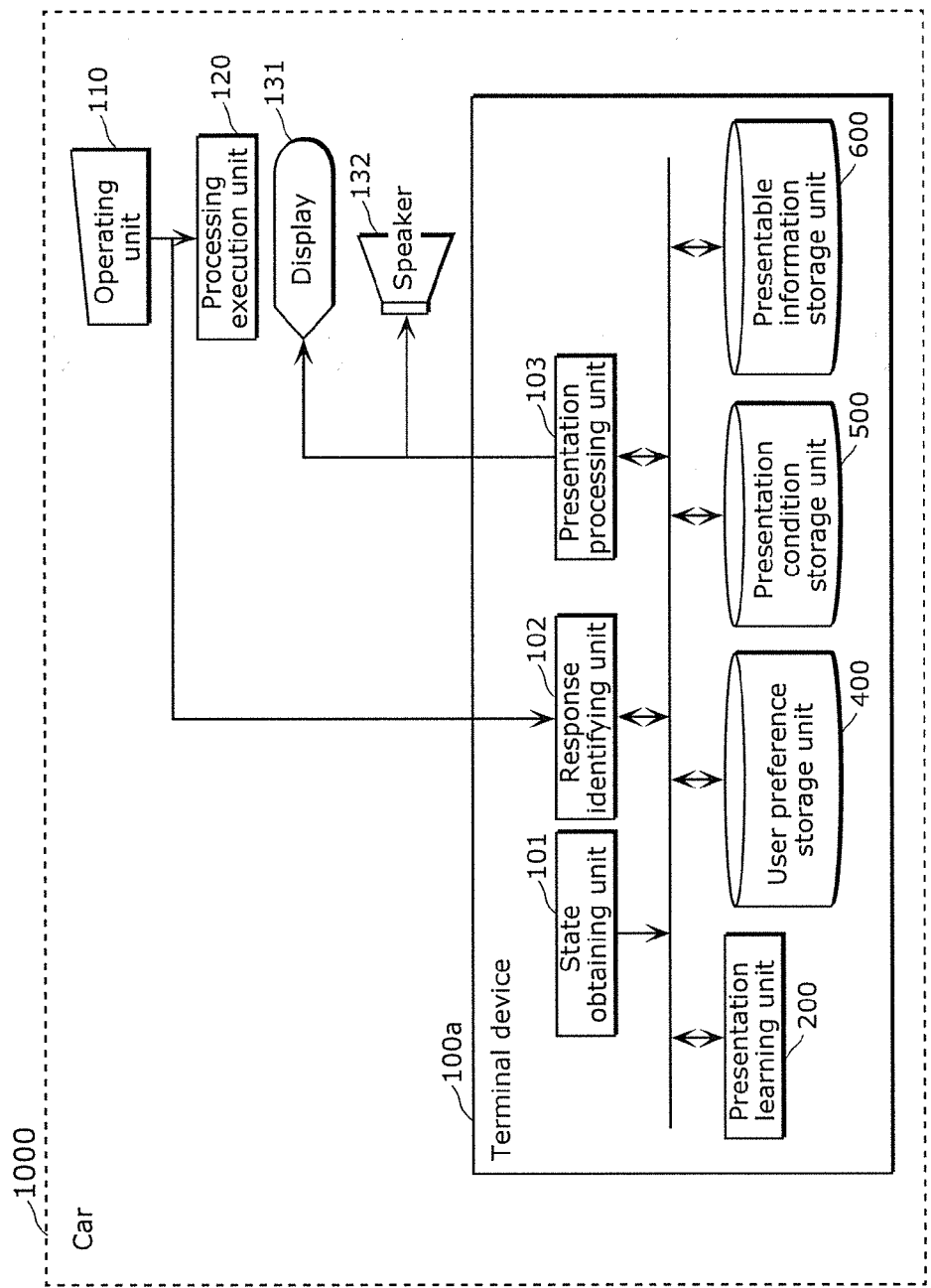
FIG. 13 is a block diagram illustrating a configuration of a terminal device according to the variation of the embodiment.

FIG. 13 is a block diagram illustrating a configuration of a terminal device according to this variation.

The terminal device 100a includes the constituent elements other than the terminal communication unit 104 of the terminal device 100 according to Embodiment 1, and further includes: a presentation learning unit 200; a user preference storage unit 400; a presentation condition storage unit 500; and a presentable information storage unit 600. Accordingly, the terminal device 100a is capable of performing learning without communicating with the server 2000, selecting and presenting a useful presentable information item to the driver using the result of the learning.

The terminal device 100a according to this variation includes all constituent elements of: the presentation learning unit 200; the user preference storage unit 400; the presentation condition storage unit 500; and the presentable information storage unit 600. However, the terminal device 100a may include at least one of the constituent elements, and the server 2000 may include the other constituent elements. In this case, the terminal device 100a includes a terminal communication unit 104 for communicating with the server 2000. In addition, the terminal device 100a includes all of the constituent elements of the presentation learning unit 200. However, the terminal device 100a may include only one of the constituent elements, and the server 2000 may include the other constituent elements.

In the embodiment and the variation, the type of the response from the driver is judged based on the result of the response from the driver and the driving load, and the reference information item (the priority or the presentation condition) is updated according to the judged type. However, the reference information item may be updated directly based on the result of the response from the driver and the driving load without judging the type of the response from the driver. In other words, in Step S160 (learning step), when the result of the response obtained indicates that there was no response from the driver, whether the identified driving load is smaller than a threshold value or not is judged. When the driving load is judged to be larger than or equal to the threshold value, the reference information item associated with a corresponding one of a plurality of presentable information items is maintained. On the other hand, when the driving load is judged to be smaller than the threshold value, the reference information item associated with a corresponding one of the plurality of presentable information items is changed.

In the embodiment and the variations thereof, the device that is a target to be operated by the operating unit 110 may be an air conditioning device such as an air conditioner, and any other device. For example, an operation target device may be the terminal device 100. Alternatively, operation target devices may be information devices such as a navigation device, an AV device, a mobile terminal, a personal computer, a tablet, a smartphone, and a display. Operations may be an operation of opening or closing a window, an operation on a device for antifog etc., an operation of switching ON/OFF a wiper, an operation on an air conditioning device, an operation of opening or closing a refrigerator, and driving-related operations using an accelerator, a brake, and a handle.

In the embodiment and the variation, the response type judging unit 231 judges whether or not the driving load is small using the predetermined threshold value. However, the threshold value may be determined in any way. For example, the response type judging unit 231 may determine the average value of the driving load as a threshold value, and may determine the median value of all of driving loads as a threshold value. In addition, the response type judging unit 231 may determine a certain fixed value as a threshold value, or may determine a value calculated using another method as a threshold value.

In the embodiment and the variations thereof, the movable body is either the car 1000 or the terminal device 100.

However, the movable body may be any one that is movable by the user. Examples include a motorcycle, a bicycle, an electric train, an air plane, a mobile phone, a tablet, and a notebook computer. In addition, the user of the movable body does not always need to move together with the movable body, and may control the movable body remotely.

In the embodiment and the variations thereof, a position that is an example of a state indicated by a state information item d1 is a position measured using a GPS. However, a position may be a position measured using another system. The state obtaining unit 101 may obtain a state information item d1 indicating the state of a position etc. through the communication network 3000.

In the embodiment and the variations thereof, at least one of an image and a speech is used to present the presentable information item d3 to the driver. However, any other information communication medium which makes an approach to the user may be used to present the presentable information item d3. For example, the presentable information item d3 may be presented using a sense of touch or a sense of smell. In addition, the above-described embodiment and the variations thereof may be arbitrarily combined.

In the embodiment and the variations thereof, the presentation learning unit 200 includes the selecting unit 240, but may not always include the selecting unit 240. In other words, the presentation information learning device which performs learning for presenting information to the driver of the movable body can learn appropriately without the selecting unit 240.

Figure 14A:
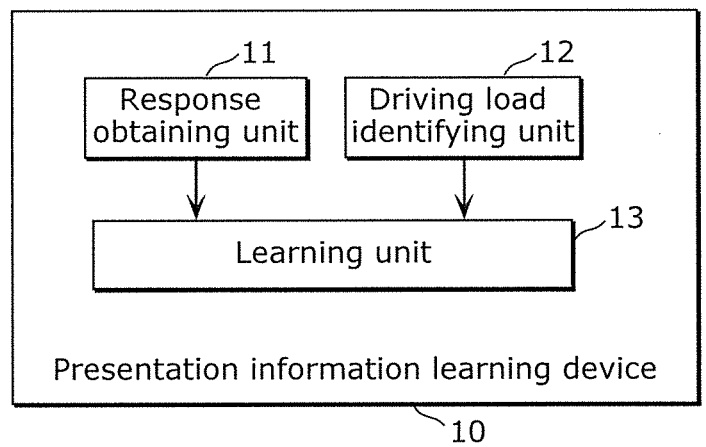
FIG. 14A is a block diagram illustrating a configuration of a presentation information learning device.

FIG. 14A is a block diagram illustrating a configuration of a presentation information learning device which does not include the selecting unit 240.

The presentation information learning device 10 is a presentation information learning device which performs learning for presenting information to a driver of a movable body, and includes a response obtaining unit 11, a driving load identifying unit 12, and a learning unit 13. The response obtaining unit 11 obtains the result of a response from the driver to a presentable information item that has been presented to the user from among a plurality of presentable information items. The driving load identifying unit 12 identifies a driving load on the driver. The learning unit 13 performs learning as described above by updating the reference information item associated with the presentation information item from among reference information items which are associated one-to-one with a plurality of presentable information items and are to be referred to for judging whether the corresponding presentable information items are to be presented, based on the identified driving load and the obtained result of the response.

Figure 14B:
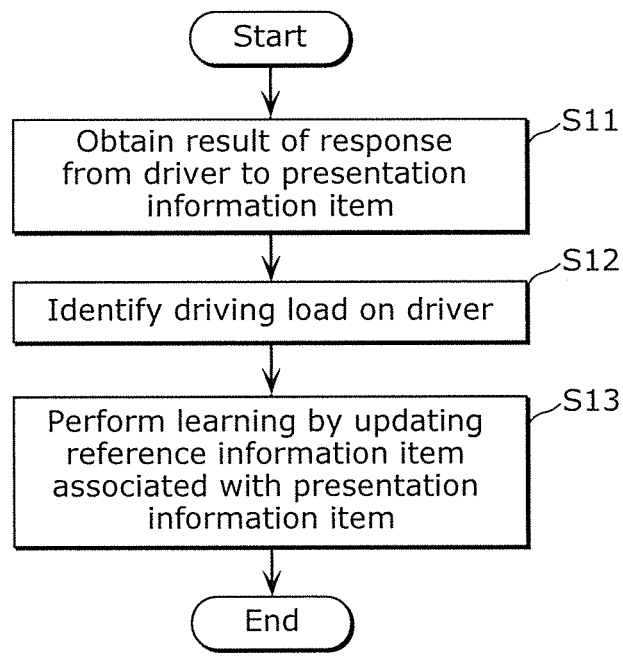
FIG. 14B is a flowchart of a presentation information learning method performed by the presentation information learning device.

FIG. 14B is a flowchart of a presentation information learning method performed by the presentation information learning device 10.

This presentation information learning method is a presentation information learning method for performing learning for presenting information to the driver of the movable body, and includes a response obtaining step S11, a driving load identifying step S12, and a learning step S13. In the response obtaining unit S11, the result of the response from the driver to the presentable information item that has been presented to the driver is obtained from among the plurality of presentable information items. The driving load identifying unit 12 identifies the driving load on the driver. In the learning step S13, learning as described above is performed by updating the reference information item associated with the presentable information item from among the reference information items which are associated one-to-one with the plurality of presentable information items and are to be referred to for judging whether the corresponding presentable information items are to be presented, based on the identified driving load and the obtained result of the response.

It is to be noted that each of the constituent elements in the embodiment and variations thereof may be configured in the form of an exclusive hardware product, or may be implemented by executing a software program suitable for the constituent element. Each of the constituent elements may be implemented by means of a program execution unit, such as a CPU and a processor, reading and executing the software program recorded on a recording medium such as a hard disk or a semiconductor memory. Here, the software which implements the presentation information learning device in the embodiment and variations thereof may be a program causing a computer to execute the presentation information learning method including the above-described Steps S11 to S13.

In addition, the embodiment and the variations thereof are applicable to an information provision system which provides services described below.

(Entire Configuration of Service Provided)

Figure 15:
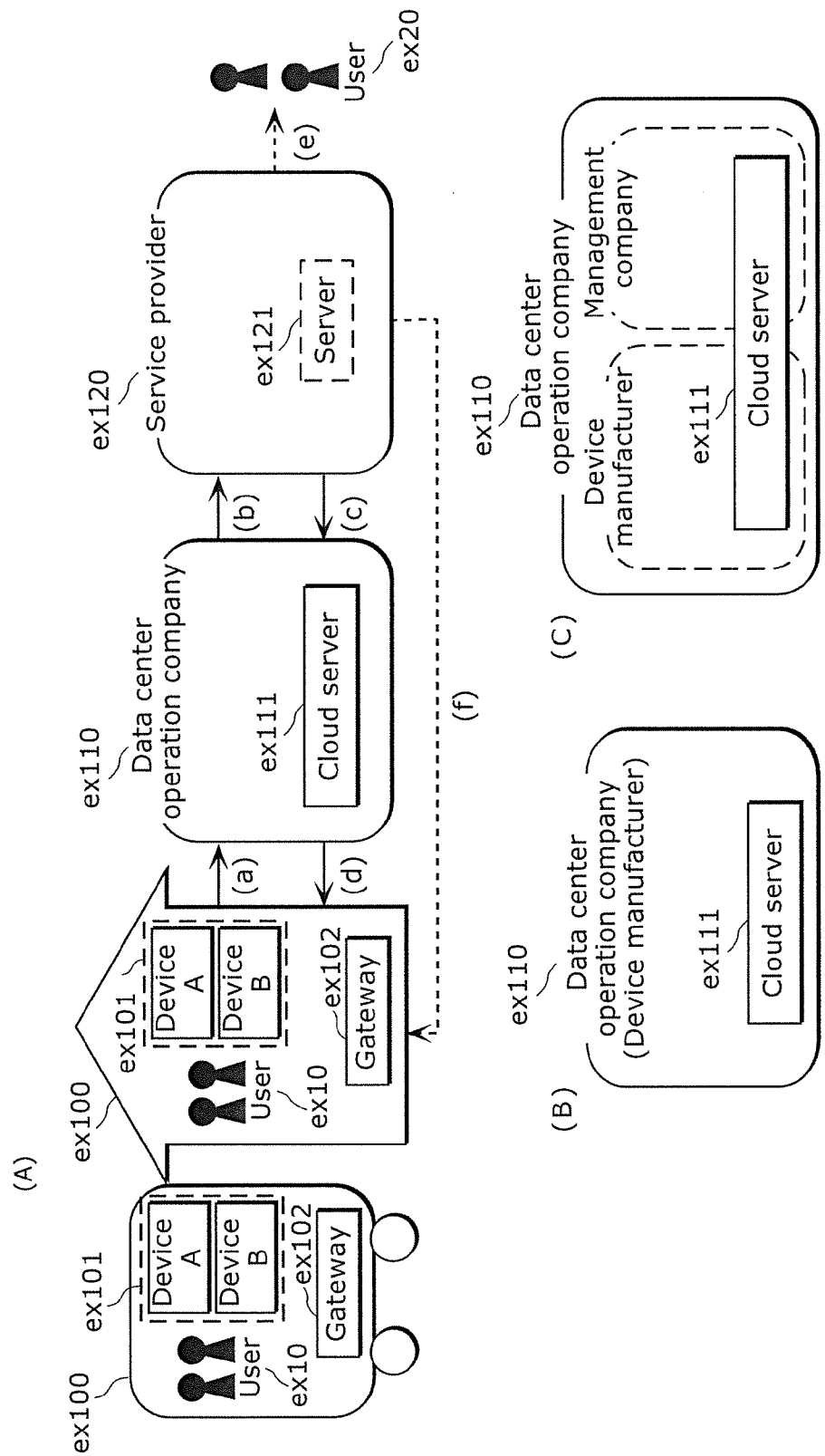
FIG. 15 is an illustration of an entire configuration of an information provision system applicable to the embodiment and a variation thereof.

FIG. 15(A) is an illustration of an entire configuration of an information provision system applicable to the embodiment and variations thereof.

A group ex100 is, for example, a company, a community, a home or the like of any size. The group ex100 includes a plurality of devices ex101, namely a device A and a device B, and a gateway ex102. The devices ex101 may include a device connectable to the Internet (a smartphone, a PC, a TV, or the like) and a device unconnectable to the Internet by itself (a lighting fixture, a washing machine, a refrigerator, a car navigation device, or the like). A device that is unconnectable to the Internet by itself but is connectable to the Internet via the gateway ex102 may be included. Furthermore, the group ex100 includes users ex10 who use the devices ex101. It is to be noted that the group ex100 corresponds to a car 1000 in the embodiment and variations thereof.

The data center operation company ex110 has a cloud server ex111. The cloud server ex111 is a virtual server which links with a variety of devices via the Internet. The data center operation company ex110 manages a huge amount of data (big data) etc. which are difficult to deal with by a general database management tool or the like. The data center operation company ex110 manages data and the cloud server ex111, and operates the data center which performs the management. The services provided by the data center operation company ex110 will be described in detail later. Here, the data center operation company ex110 is not limited to a company which only performs management of the data and operation of the cloud server ex111. For example, when a device manufacturer which develops and manufactures one of the devices ex101 also performs management etc. of data and the cloud server ex111, the device manufacturer corresponds to the data center operation company ex110 ((B) in FIG. 15). Furthermore, the data center operation company ex110 is not limited to one company. For example, when the device manufacturer manages data and operates the cloud server ex111 in collaboration or by sharing with a device manufacturer and an other management company, both or one of them corresponds to the data center operation company ex110 ((C) in FIG. 15).

The service provider ex120 has a server ex121. The server ex121 here can be of any size and includes a memory in a PC for individual use, for example. A service provider in another case may not have a server ex121.

It is to be noted that the gateway ex102 is not mandatory in the above service. For example, when the cloud server ex111 manages all the data, the gateway ex102 is not required. Furthermore, there are cases where the devices unconnectable to the Internet by themselves do not exist at home, such as when all the devices are connected to the Internet. Here, at least one of the cloud server ex111 and the server ex121 corresponds to the server 2000 in the above-described embodiment and variations thereof.

Next, a flow of information in the service is described.

First, the device A or the device B in the group ex100 transmits each of log information items to the cloud server ex111 in the data center operation company ex110. The cloud server ex111 stores the log information items of the device A or the device B ((a) in FIG. 15). Here, each log information item indicates, for example, an operation status and an operation date and time of a corresponding one of the devices 101. Non-limiting examples of the log information items include a viewing history of a TV, video timer recording information of a recorder, the operation date and time of a washing machine, the amount of laundry, the date and time or the number of times of opening and closing a refrigerator. All information items obtainable from any devices can be referred to as log information items. There are cases where log information items are directly provided to the cloud server ex111 from the devices ex101 themselves via the Internet. Furthermore, the log information items may be temporarily stored to the gateway ex102 from the devices ex101, and then are provided to the cloud server ex111 from the gateway ex102.

Next, the cloud server ex111 in the data center operation company ex110 provides, in constant units, the stored log information items to the service provider ex120. Here, the unit may be a unit by which the information items stored by the data center operation company can be organized and provided to the service provider ex120, or in a unit which is requested by the service provider ex120. Although the unit does not always need to be constant, and the amount of information to be provided may change according to the situation in some cases. The log information items are stored in the server ex121 of the service provider ex120, as necessary ((b) in FIG. 15). The service provider ex120 organizes the log information items suitably for the service to be provided to the user, and provides the suitable information to the user. The user to be provided with the information may be the user ex10 who uses the devices ex101 or an external user ex20. The service provision method may provide information directly to the user from the service provider ((b) and (e) in FIG. 15), for example. Furthermore, according to the service provision method may be provided to the user, for example, via the cloud server ex111 in the data center operation company ex110 again ((c) and (d) in FIG. 15). Furthermore, the cloud server ex111 in the data center operation company ex110 may organize the log information items suitably for the service to be provided to the user, and may provide them to the service provider ex120.

It is to be noted that the users ex10 and the users ex20 may be either different or the same.

The technique in the above-described embodiment and variations thereof may be implemented in, for example, the following types of cloud services. It should be noted that implementation of the technique described in the above embodiment and variations thereof is not limited to these types.

(Service Type 1: Own Data Center Type)

Figure 16:
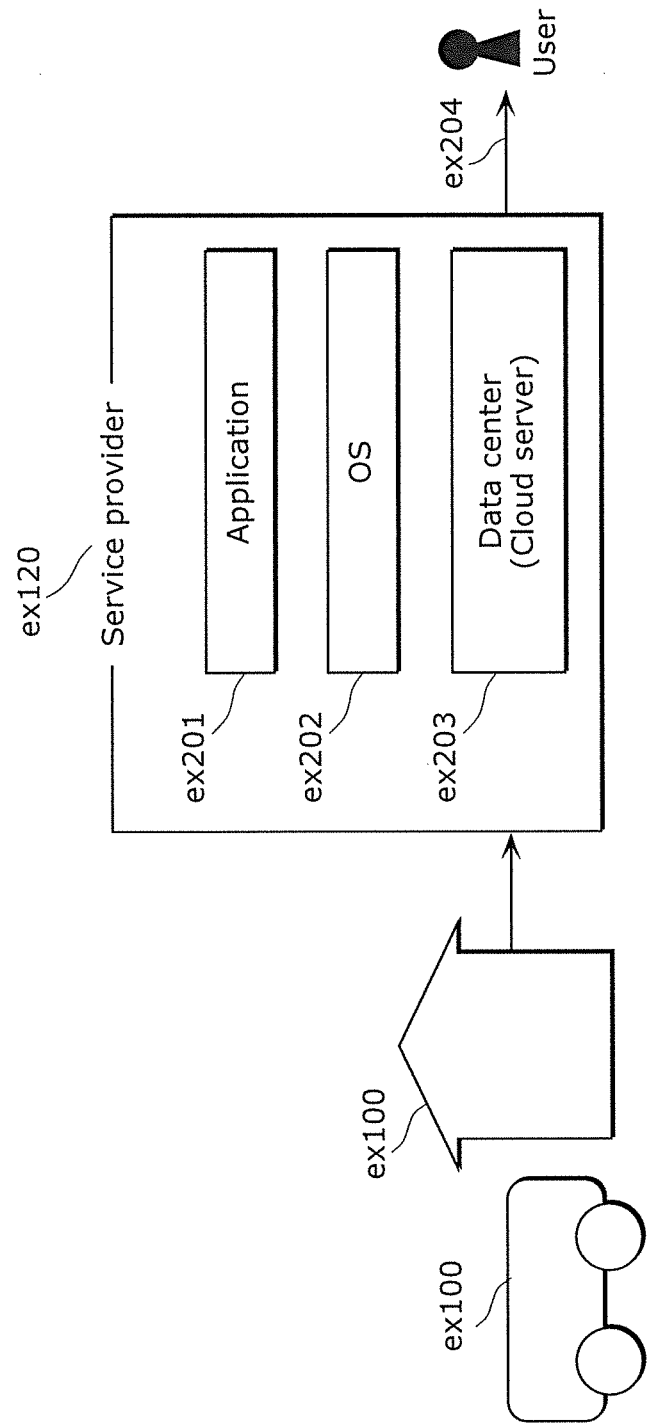
FIG. 16 is an illustration of a service type 1 (company's own data center type) applicable to the embodiment and the variation thereof.

FIG. 16 is a diagram illustrating a service type 1 (own data center type). In this type, a service provider ex120 obtains information from a group ex100 and provides a service to users. The service provider ex120 in this type serves as a data center operation company. In other words, the service provider owns a cloud server ex111 for managing big data. Thus, there is no company exclusive for data management.

In this type, the service provider ex120 operates and manages a data center (cloud server ex111) (ex203). Furthermore, the service provider ex120 manages an OS (ex202) and applications (ex201). The service provider ex120 provides a service (ex204) using the OS (ex202) and the applications (ex201) managed by the service provider ex120.

(Service Type 2: IaaS-Based Type)

Figure 17:
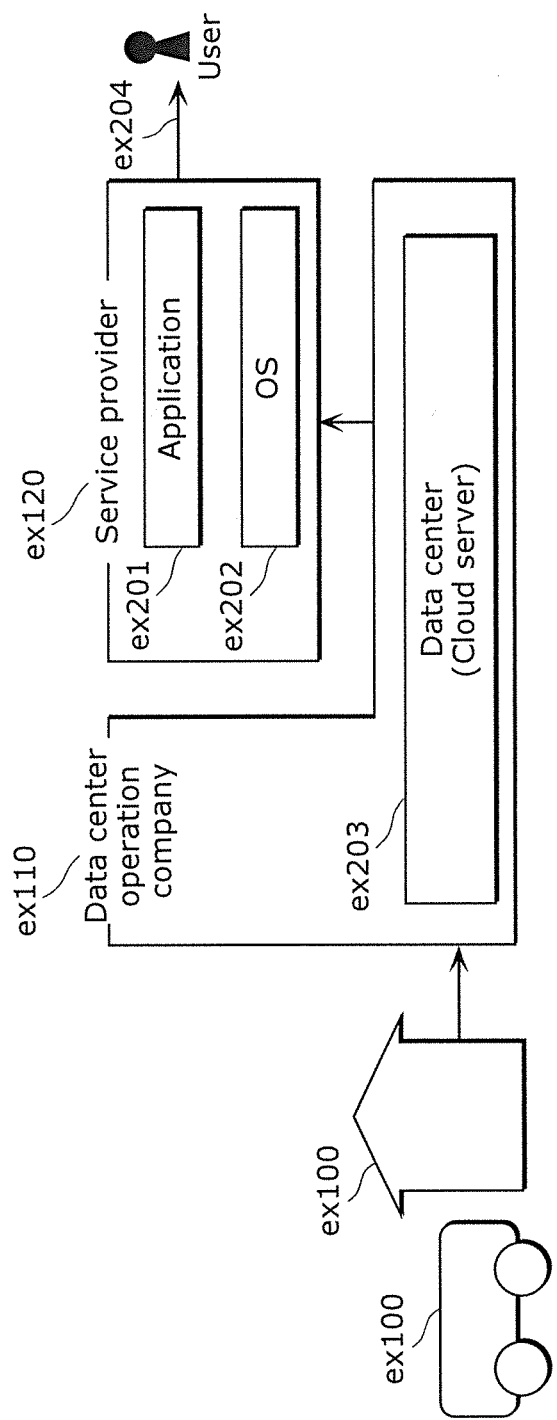
FIG. 17 is an illustration of a service type 2 (IaaS-based type) applicable to the embodiment and the variation thereof.

FIG. 17 is a diagram illustrating a service type 2 (IaaS-based type). Here, IaaS is an acronym for an Infrastructure as a Service, and refers to a cloud service providing model in which an infrastructure for building and running a computer system is provided as a service via the Internet.

In this type, a data center operation company operates and manages a data center (cloud server ex111) (ex203). Furthermore, the service provider ex120 manages an OS (ex202) and applications (ex201). The service provider ex120 provides a service (ex204) using the OS (ex202) and the applications (ex201) managed by the service provider ex120.

(Service Type 3: Paas-Based Type)

Figure 18:
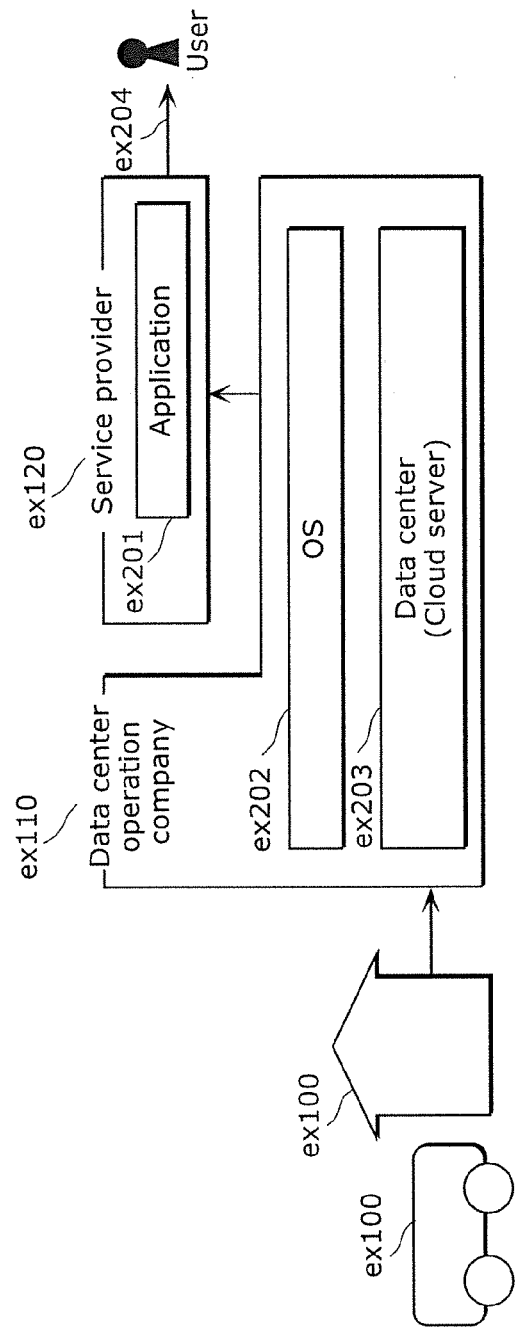
FIG. 18 is an illustration of a service type 3 (PaaS-based type) applicable to the embodiment and the variation thereof.

FIG. 18 is a diagram illustrating a service type 3 (PaaS-based type). Here, PaaS is an acronym for a Platform as a Service, and refers to a cloud service in which a platform for composing and running software is provided as a service via the Internet.

In this type, a data center operation company ex110 manages the OS (ex202), and operates and manages a data center (cloud server ex111) (ex203). Furthermore, the service provider ex120 manages the applications (ex201). The service provider ex120 provides a service (ex204) using the OS (ex202) managed by the data center operation company and the applications (ex201) managed by the service provider ex120.

(Service Type 4: Saas-Based Type)

Figure 19:
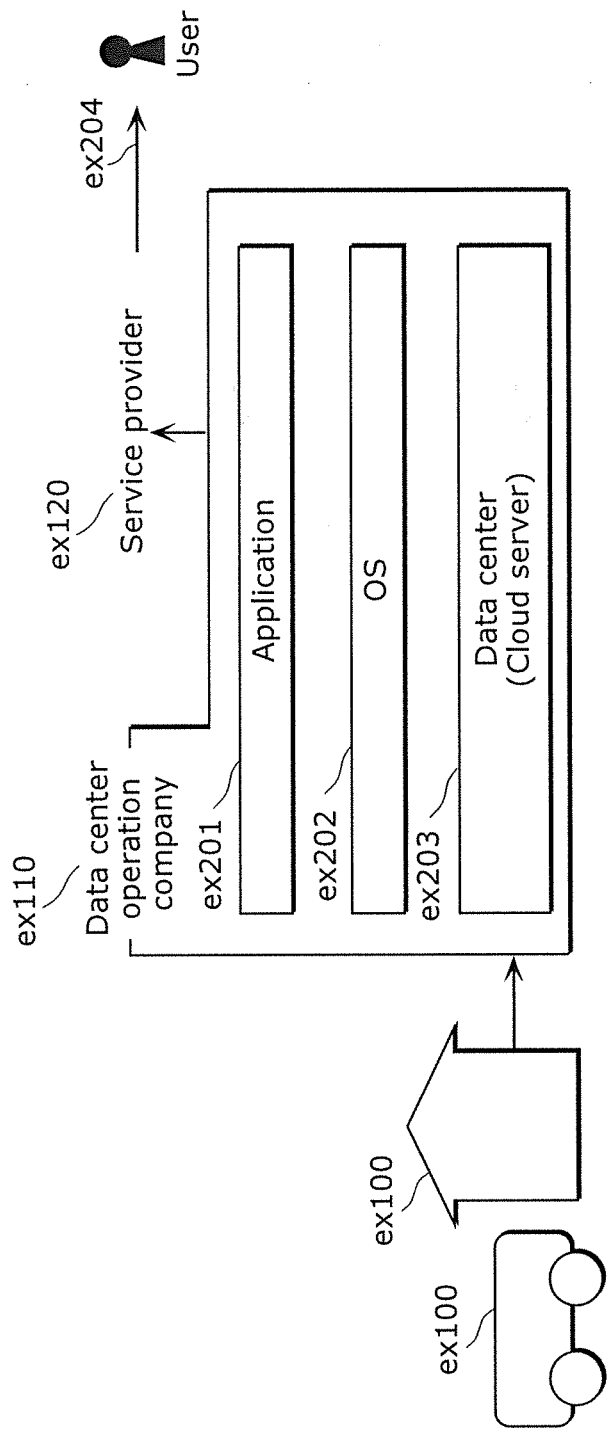
FIG. 19 is an illustration of a service type 4 (Saas-based type) applicable to the embodiment and the variation thereof.

FIG. 19 is a diagram illustrating a service type 4 (SaaS-based type). Here, SaaS is an acronym for Software as a Service. For example, SaaS refers to a cloud service in which a company or a person (user) which does not have a data center (cloud server) is authorized to access an application provided by a platform provider having a data center (cloud server) via a network such as the Internet.

In this type, a data center operation company ex110 manages the applications (es201) and the OS (ex202), and operates and manages the data center (cloud server ex111) (ex203). The service provider ex120 provides a service (ex204) using the OS (ex202) and the applications (ex201) managed by the data center operation company ex110.

In any of these types, it is assumed that the service provider ex120 provides the service. For example, the service provider or the data center operation company may develop an OS, applications, a big data database, etc. by itself or may outsource the development to a third party.

Although the present invention has been described based on each of the above non-limiting embodiment and variations thereof, it is to be noted that the present invention is not limited to the embodiment etc. The cases as described below are also included in the present invention.

(1) Each of the above-described devices is, specifically, a computer system including a microprocessor, a ROM, a RAM, a hard disk unit, a display unit, and so on. A computer program is stored in the RAM or the hard disk unit. The respective devices achieve their functions through the microprocessor's operations according to the computer program. Here, the computer program is configured by combining plural instruction codes indicating instructions for the computer.

(2) A part or all of the constituent elements of the respective devices may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. A computer program is stored in the RAM. The system-LSI achieves its function through the microprocessor's operations according to the computer program.

(3) A part or all of the constituent elements constituting the respective devices may be configured as an IC card which can be attached to and detached from the respective devices or as a stand-alone module. The IC card or the module is a computer system configured from a microprocessor, a ROM, a RAM, and so on. The IC card or the module may also be included in the above-described super-multi-function LSI. The IC card or the module achieves its functions through the microprocessor's operations according to the computer program. The IC card or the module may also be implemented to be tamper-resistant.

(4) The present invention may be implemented as the method as described above. Alternatively, the present invention may be implemented as computer programs for executing the above-described method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray (registered trademark) Disc), and a semiconductor memory. Furthermore, the present invention may also be implemented as the digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the above-described computer program and the microprocessor operates according to the computer program.

Furthermore, it is also possible to execute another independent computer system by transmitting the programs or the digital signals recorded on the above-described recording media, or by transmitting the programs or digital signals via the above-described network and the like.

(5) Any combination of the embodiment and variations thereof is possible.

INDUSTRIAL APPLICABILITY

The present invention provides an advantageous effect of being able to appropriately perform learning for presenting useful information to a driver. The present invention is applicable to car navigation devices, mobile phones, tablet terminals, personal computers, servers etc.

REFERENCE SIGNS LIST

10 Presentation information learning device
11 Response obtaining unit
12 Driving load identifying unit
13 Learning unit
100 Terminal device
101 State obtaining unit
102 Response identifying unit
103 Presentation processing unit
104 Terminal communication unit
110 Operation unit
120 Processing execution unit
131 Display
132 Speaker
200, 200a Presentation learning unit
210 Driving load identifying unit
220 Response obtaining unit
230, 230a Learning unit
231 Response type judging unit
232 Priority updating unit
233 Priority condition updating unit
234 Switch
240 Selecting unit
300 Server communication unit
400 User preference storage unit
500 Presentation condition storage unit
600 Presentable information storage unit
1000 Car
2000 Server
3000 Communication network
d1 State information
d2 Response information
d3 Presentable information

The invention claimed is:

1. A vehicle terminal device, located in a vehicle, comprising:
a state obtaining unit that obtains state information indicating a state of at least one of: the vehicle, a device in the vehicle, a driver of the vehicle, or a passenger in the vehicle;
an output unit that outputs a presentation information item, which is an information item from a plurality of presentable information items, the presentable information items being stored in a database with reference information items that are stored in the database in one-to-one association with the plurality of presentable information items, the reference information items being items that are referred to for judging whether or not to present the presentable information items, respectively;
a response identifying unit that obtains a result of a response, from the driver of the vehicle, to the presentation information item outputted by the output unit; and
a processor that:
judges whether to present the presentation information item based on a reference information item associated with the presentation information in the database, and sends the presentation information item to the output unit if the processor judges that the presentation information item is to be presented,
determines a driving load on the driver in a period in which the presentation information item is presented by the output unit, based on the state information obtained by the state obtaining unit, judges whether or not the driving load is less than a predetermined threshold value when the result of the response obtained by the response identifying unit indicates that there was no response from the driver, updates the reference information item associated with the presentation information item when (i) the processor judges that the driving load is less than the predetermined threshold value, and (ii) the result of the response obtained by the response identifying unit indicates that there was a response from the driver, and skips updating of the reference information item associated with the presentation information item when the processor judges that the driving load is greater than or equal to the predetermined threshold value.

2. The vehicle terminal device according to claim 1, wherein the reference information item is a priority, and the presentation information item presented to the driver is a recommendation information item, and when the result of the response obtained indicates that there was the response from the driver:

the processor increases the priority associated with the presentation information item when the response from the driver is judged to be positive, and decreases the presentation information item when the response from the driver is judged to be negative.

3. The vehicle terminal device according to claim 1, wherein the reference information item is a condition to be satisfied for presenting the presentation information item, and the presentation information item is a recommendation information item, and in the case where the result of the response obtained is judged to be positive or negative when the result of the response indicates that there was the response from the driver, the processor updates the condition associated with the presentation information item.

4. The vehicle terminal device according to claim 1, wherein the processor further:

selects one presentable information item from among the plurality of presentable information items with reference to the reference information items associated one-to-one with the plurality of presentable information items, and causes the output unit to output the presentable information item as the presentation information item.

5. The vehicle terminal device according to claim 4, wherein each of the plurality of presentable information items is associated with corresponding ones of the reference information items, the ones being a condition to be satisfied for presenting the presentation information item and a priority, and the processor selects one of the presentation information items which is associated with a priority higher than a reference value and a condition that satisfies the state indicated by the state information item obtained, and causes the output unit to output the selected presentation information item.

6. The vehicle terminal device according to claim 1, further comprising:

a communication unit which transmits, to a server, the response identified by the response identifying unit and the state information.

7. A server and vehicle terminal system comprising:

a server including a database storing a plurality of presentable information items, and reference information items in one-to-one association with the plurality of presentable information items, the reference information items being items that are referred to for judging whether or not to present the presentable information items, respectively;

a vehicle terminal located in a vehicle;

a state obtaining unit, in the vehicle, that obtains state information indicating a state of at least one of: the vehicle, a device in the vehicle, a driver of the vehicle, or a passenger in the vehicle;

an output unit, in the vehicle, that outputs a presentation information item, which is an information item from the plurality of presentable information items in the database;

a response identifying unit, in the vehicle terminal, that obtains a result of a response, from the driver of the vehicle, to the presentation information item outputted by the output unit; and a processor, in the server, that:

judges whether to present the presentation information item based on a reference information item associated with the presentation information in the database, and sends the presentation information item to the vehicle terminal to be output by the output unit if the processor judges that the presentation information item is to be presented, determines a driving load on the driver in a period in which the presentation information item is presented on the output unit, based on the state information obtained by the state obtaining unit, judges whether or not the driving load is less than a predetermined threshold value when the result of the response obtained by the response identifying unit indicates that there was no response from the driver, updates the reference information item associated with the presentation information item when (i) the processor judges that the driving load is less than the predetermined threshold value, and (ii) the result of the response obtained by the response identifying unit indicates that there was a response from the driver, and skips updating of the reference information item associated with the presentation information item when the processor judges that the driving load is greater than or equal to the predetermined threshold value.

8. The server and vehicle terminal system according to claim 7, further comprising:

a communication unit, in the vehicle terminal, which transmits, to the server, the response identified by the response identifying unit and the state information.

* * * * *